US010458230B2

(12) United States Patent
Donderici et al.

(10) Patent No.: US 10,458,230 B2
(45) Date of Patent: Oct. 29, 2019

(54) FORMATION RESISTIVITY MEASUREMENT APPARATUS, SYSTEMS, AND METHODS

(71) Applicant: Halliburton Energy Services, Inc., Houston, TX (US)

(72) Inventors: Burkay Donderici, Houston, TX (US); Luis Emilio San Martin, Houston, TX (US); Baris Guner, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/904,776

(22) PCT Filed: Feb. 27, 2015

(86) PCT No.: PCT/US2015/018043
§ 371 (c)(1),
(2) Date: Jan. 13, 2016

(87) PCT Pub. No.: WO2016/137500
PCT Pub. Date: Sep. 1, 2016

(65) Prior Publication Data
US 2016/0369626 A1    Dec. 22, 2016

(51) Int. Cl.
*E21B 49/00* (2006.01)
*E21B 7/04* (2006.01)
(Continued)

(52) U.S. Cl.
CPC .............. *E21B 49/003* (2013.01); *E21B 7/04* (2013.01); *E21B 44/02* (2013.01); *E21B 49/00* (2013.01); *G01V 3/38* (2013.01); *G01V 13/00* (2013.01)

(58) Field of Classification Search
CPC .................................................... E21B 49/003
See application file for complete search history.

(56) References Cited

U.S. PATENT DOCUMENTS 6,925,384 B2    8/2005  Frenkel et al.
2006/0095239 A1*  5/2006  Frenkel .................... G01V 3/28
                                                                703/5
(Continued)

FOREIGN PATENT DOCUMENTS

WO    WO-2004029660 A2    4/2004

OTHER PUBLICATIONS

"International Application Serial No. PCT/US2015/018043, International Search Report dated Nov. 4, 2015", 3 pgs.
(Continued)

*Primary Examiner* — Manuel A Rivera Vargas
(74) *Attorney, Agent, or Firm* — Gilliam IP PLLC

(57) ABSTRACT

Apparatus, systems, and methods may operate to correct measured resistivity data for borehole effects to provide borehole-corrected apparent resistivity data for a non-invaded formation. Additional activity may include inverting the measured resistivity data or the borehole-corrected apparent resistivity data to provide non-invaded true resistivity values for the non-invaded formation, inverting the measured resistivity data to provide invaded true resistivity values for an invaded formation, determining true resistivity values for a geological formation associated with the measured resistivity data as a weighted combination of the non-invaded true resistivity values and the invaded true resistivity values, and operating a controlled device according to the true resistivity values for the geological formation.

23 Claims, 14 Drawing Sheets

(51) Int. Cl.
*E21B 44/02* (2006.01)
*G01V 3/38* (2006.01)
*G01V 13/00* (2006.01)

(56) References Cited

U.S. PATENT DOCUMENTS

2009/0082969 A1 3/2009 Rabinovich et al.
2013/0024121 A1 1/2013 Samworth
2015/0284619 A1* 10/2015 Price Hoelscher ...... C09K 8/32
175/45

OTHER PUBLICATIONS

"International Application Serial No. PCT/US2015/018043, Written Opinion dated Nov. 4, 2015", 4 pgs.

* cited by examiner

FORMATION RESISTIVITY MEASUREMENT APPARATUS, SYSTEMS, AND METHODS

PRIORITY APPLICATIONS

This application is a U.S. National Stage filing under 35 U.S.C. § 371 from International Application No. PCT/US2015/018043, filed on 27 Feb. 2015, which application is incorporated herein by reference in its entirety.

BACKGROUND

Understanding the structure and properties of geological formations often reduces the cost of drilling wells for oil and gas exploration. Measurements are typically performed in a borehole (i.e., downhole measurements) in order to attain this understanding. To obtain such measurements, a variety of sensors and mounting configurations may be used.

For example, resistivity tools are widely used in oil field exploration applications for determining zones in a formation that may contain hydrocarbons. Accurate determination of the formation resistivity is useful in assessing the feasibility of production for a particular well. However, resistivity measured by the tool is affected by factors other than the formation resistivity. For example, the presence of the borehole itself, as well as invasion zones, may change the measurement values. A borehole correction can be applied to offset the effect of the borehole. However, invasion effects are often harder to resolve because invaded formation resistivity values may approach those of the non-invaded formation, which makes the invasion radius difficult to determine. For example, when the invasion resistivity is equal to the formation resistivity, inversion may determine the invasion radius to lie between zero to infinity—either of which might be equally correct.

DETAILED DESCRIPTION

Introduction to Various Embodiments

To address some of these challenges, as well as others, apparatus, systems, and methods are described herein that improve resistivity measurement accuracy in an invaded formation. In some embodiments, this is the result of implementing a novel approach for performing one-dimensional (1D) radial inversions of the measured resistivity data. In this way, array type resistivity tools can be used to obtain a radial resistivity profile and thereafter, formation and invasion properties can be more accurately determined using the inversion methods described herein.

Although a variety of 1D radial inversion algorithms exist, it remains a difficult problem to perform an inversion that works well in both invaded and non-invaded formations. To solve this technical problem, the methods described herein use a weighted average of two different inversions: one associated with the assumption of an invaded formation, and one associated with the assumption of a non-invaded formation. The weights are based on the separation of borehole-corrected apparent resistivities that correspond to different depths of investigation, providing a more reliable indicator of the presence of invasion. Further improvements include the addition of regularization terms to the associated cost function, based on the separation of borehole-corrected apparent resistivities and the application of physical limits to the inversion products. The combination of enhancements provides inversions characterized by greater accuracy and speed.

To begin to understand the problem, we begin by noting that one of the most commonly used inversion types is the radial 1D inversion, where the shoulder effects are disregarded and the formation is assumed to extend infinitely in the vertical direction, with the presence of a single invasion layer. Unfortunately, the inversion in this case gives rise to an inherent ambiguity caused by the proximity of the uninvaded formation response to the response for an invaded formation. In this case, the invaded formation may be characterized by a large invasion zone where the invasion zone resistivity, Rxo, is close to that of the formation resistivity, Rt. Fortunately, various embodiments can often resolve this ambiguity.

Figure 1:
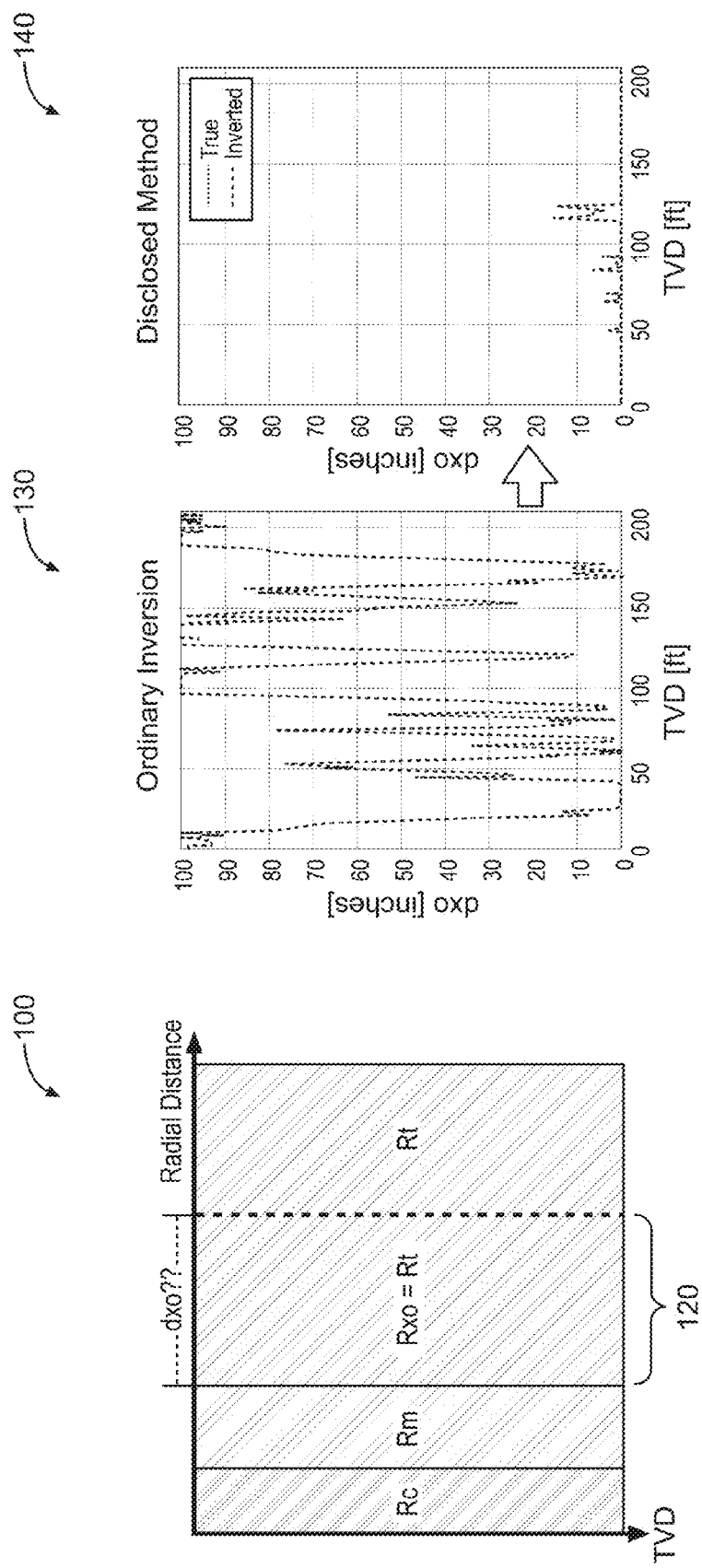
FIG. 1 illustrates the resolution of inversion ambiguity for the invasion radius dxo, according to various embodiments of the invention.

For example, FIG. 1 illustrates the resolution of inversion ambiguity for the invasion radius dxo, according to various embodiments of the invention. In the simplified formation diagram 100, Rc represents the resistivity of the tool, Rm represents the resistivity of the mud, Rxo represents the invasion zone resistivity, and Rt represents the true resistivity of the formation. When the invasion zone resistivity Rxo is close to that of the formation resistivity Rt (in the region 110), and no constraints are applied, traditional inversion methods may return values for the invasion radius dxo between zero and infinity. If a log of invasion radius is plotted under these conditions, the result appears to the observer as noise, which at best is not visually appealing and at worst, useless with respect to interpretation. Graphs 130, 140 depict the logged, inverted results for values of dxo using traditional inversion (graph 130) and an inversion according to various embodiments described herein (graph 140). As can be seen in the figure, the noise that appears in the traditional inversion results (graph 130) is greatly reduced using the novel techniques described herein (see graph 140).

In short, the benefits that accrue when the disclosed technical solution is implemented may include increasing the accuracy of the inversion by better differentiating between invaded and non-invaded zones, reducing the noise in inversion products, and providing logs that are visually appealing and easier to interpret.

Overview of Array Laterolog Tools

Array laterolog tools are employed to determine the electrical properties of a formation at different depths of investigation, which may be obtained by operating the tool using different excitation modes and applying a focusing algorithm to the measured data. These electrical properties may include resistivity measurements.

Figure 2:
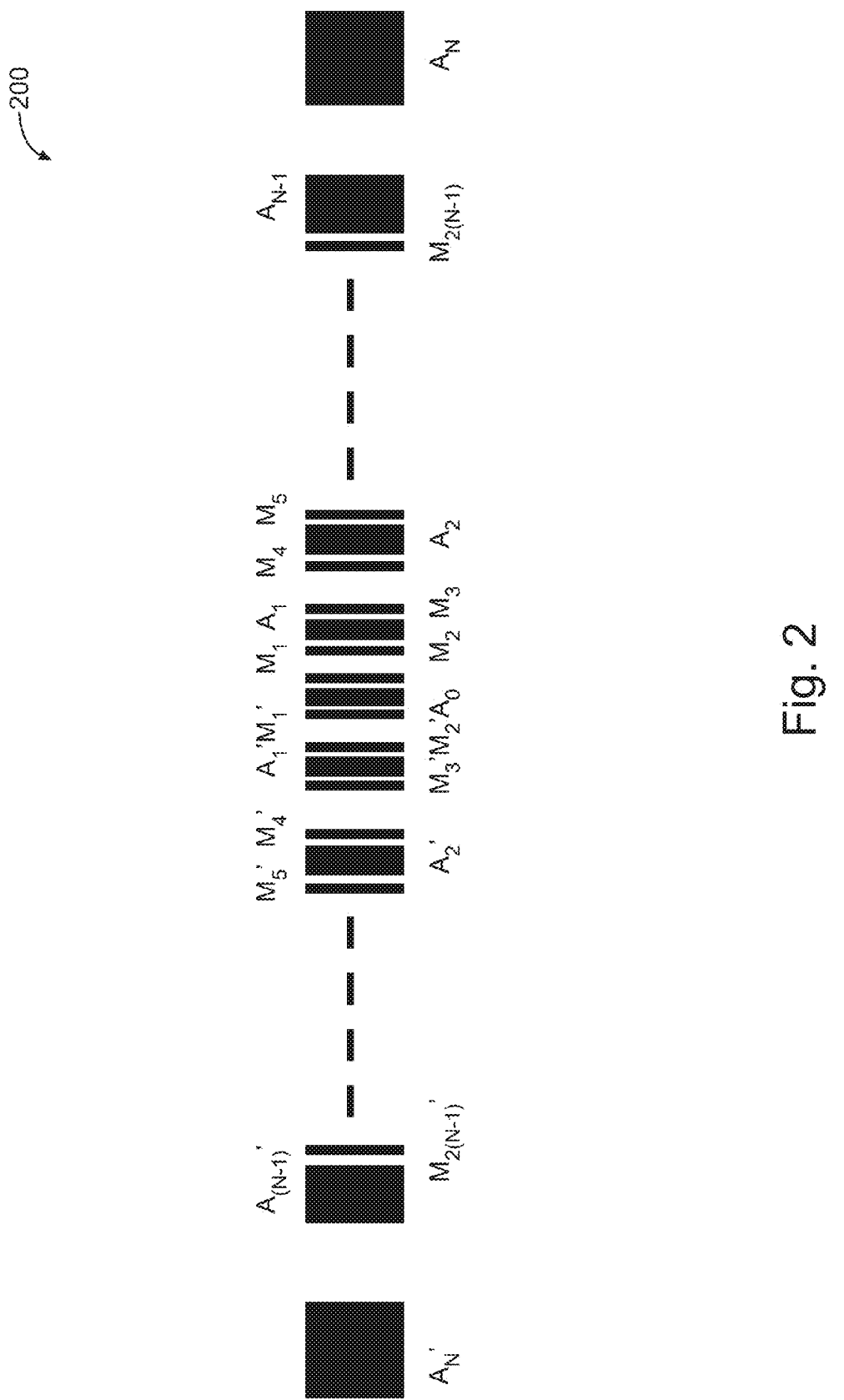
FIG. 2 is a block diagram of a laterolog array that can be operated in accordance with various embodiments of the invention.

FIG. 2 is a block diagram of a laterolog array tool 200 that can be operated in accordance with various embodiments of the invention. Here, the survey electrode is denoted by the label $A_0$. There are a total of 2N guard electrodes ($A_1$, $A_1'$, ..., $A_N$, $A_N'$) and 4N-4 monitor electrodes ($M_1$, $M_1'$, $M_2$, $M_2'$, ..., $M_{2(N-1)}$, $M_{2(N-1)}'$). Array laterolog tools are generally operated such that voltages at (or voltage differences between) monitor electrodes are measured as a function of the current emitted from different combinations of guard electrodes. As an example, the tool 200 may provide the following N excitation modes:

Excitation Mode 1: $I_{A_0} = 1$ Amperes;   Equation (1)

$I_{Ai} + I'_{Ai} = 0$, $i = 1, ..., N-1$

Excitation Mode 2: $I_{A_1} + I'_{A_1} = 1$ Amperes;

$I_{A_0} = 0$; $I_{Ai} + I'_{Ai} = 0$, $i = 2, ..., N-1$

⋮

Excitation Mode N: $I_{A_{N-1}} + I'_{A_{N-1}} = 1$ Amperes;

$I_{A_0} = 0$; $I_{Ai} + I'_{Ai} = 0$, $i = 1, ..., N-2$ where $I_{Ai}$ denotes the current emitted from electrode $A_i$. In all these excitation modes, currents are returned to current electrodes $A_N$ and $A_N'$.

Focusing algorithms use the principle of superposition in order to combine measurements from different excitation modes, providing a result that is equivalent to forcing the current emitted from the survey electrode to travel in a narrow path close to the survey electrode. This is accomplished by setting the potential difference between monitor electrode pairs to zero, preventing the flow of current in that direction. Furthermore, emitted current may be directed to return to different guard electrodes at different distances with respect to the survey electrode. Since the depth of investigation is proportional to the separation between the electrode emitting current and the return electrode, different linear combinations of excitation modes can be employed to make measurements at different depths of investigation. Software focusing is described herein, although some embodiments utilize hardware focusing, or a combination of hardware and software focusing.

It should be noted that while a laterolog array is used in the various examples that follow, this is done as a matter of convenience, and the various embodiments are not to be so limited. Thus, the methods described herein can be applied to radial 1D inversions of measurements made by a variety of tools, including array induction tools, among others.

Figure 3:
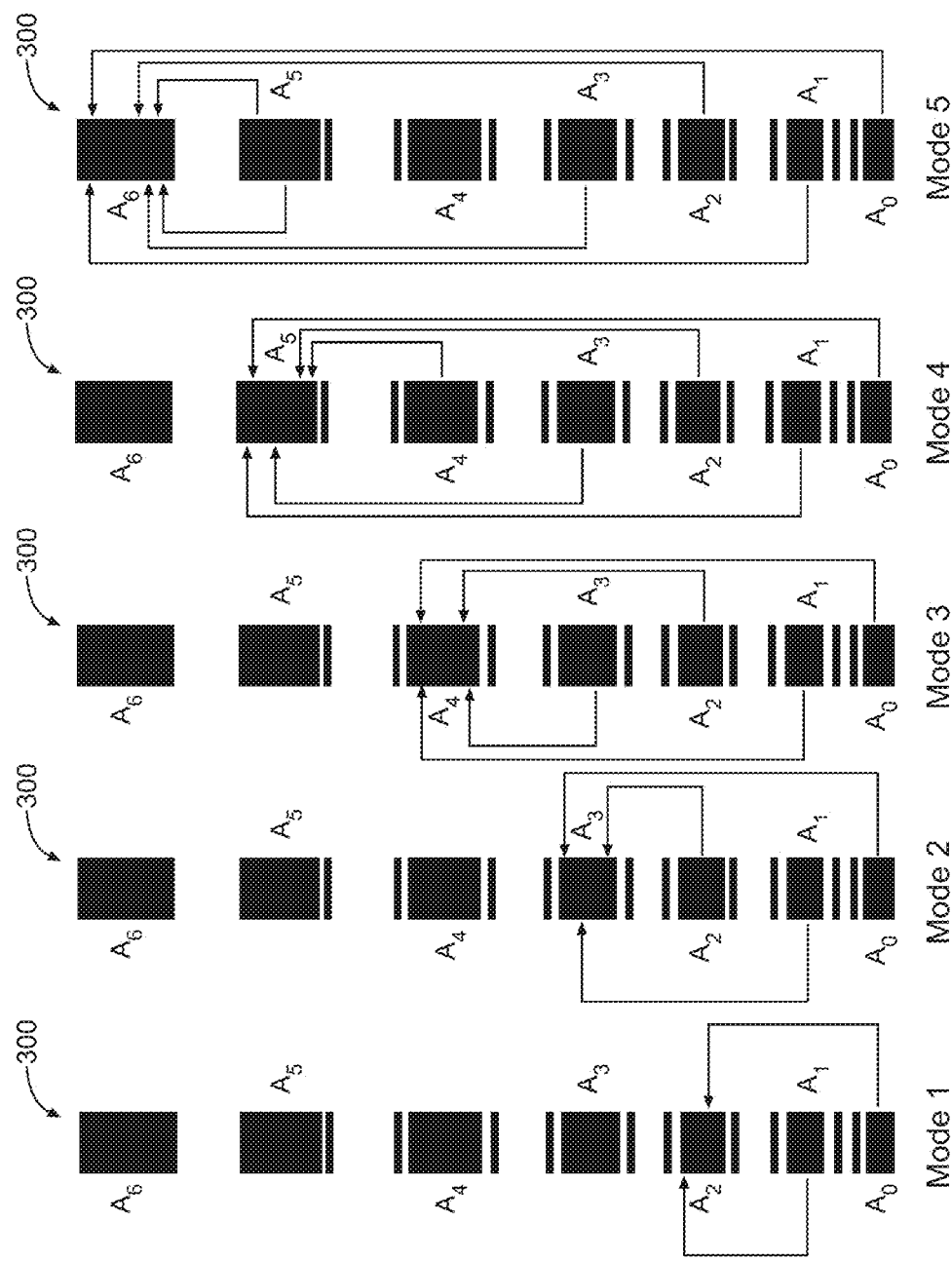
FIG. 3 illustrates operational modes of the laterolog array shown in FIG. 2.

FIG. 3 illustrates operational modes of the laterolog array shown in FIG. 2. The operational modes obtained as a result of focusing the elements of the array 200 are depicted in the figure, where only one half of the laterolog tool is shown for simplicity. That is, the primed electrodes are not shown in FIG. 3.

It is also noted that the tool 300 depicted in FIG. 3 is a special case of the tool 200 shown in FIG. 2, with N=6. Going forward, this specific configuration (i.e., N=6) will be used to provide examples of use for various method embodiments, and the operational modes 1 to 5 (i.e., N-1) for the tool 300 will now be described.

In Mode 1, currents from $A_0$, $A_1$, and $A_1'$ return to $A_2$ and $A_2'$. To accomplish focusing in this mode, the voltage difference of $(VM_1+VM_1')-(VM_2+VM_2')$ is set to 0.

In Mode 2, currents from $A_0$, $A_1$, $A_1'$, $A_2$, and $A_2'$ return to $A_3$ and $A_3'$. To accomplish focusing in this mode, the voltage differences of $(VM_1+VM_1')-(VM_2+VM_2')$ and $(VM_3+VM_3')-(VM_4+VM_4')$ are set to 0.

In Mode 3, currents from $A_0$, $A_1$, $A_1'$, $A_2$, $A_2'$, $A_3$, and $A_3'$ return to $A_4$ and $A_4'$. To accomplish focusing in this mode, the voltage differences of $(VM_1+VM_1')-(VM_2+VM_2')$, $(VM_3+VM_3')-(VM_4+VM_4')$ and $(VM_5+VM_5')-(VM_6+VM_6')$ are set to 0.

In Mode 4, currents from $A_0$, $A_1$, $A_1'$, $A_2$, $A_2'$, $A_3$, $A_3'$, $A_4$, and $A_4'$ return to $A_5$ and $A_5'$. To accomplish focusing in this mode, the voltage differences of $(VM_1+VM_1')-(VM_2+VM_2')$, $(VM_3+VM_3')-(VM_4+VM_4')$, $(VM_5+VM_5')-(VM_6+VM_6')$ and $(VM_7+VM_7')-(VM_8+VM_8')$ are set to 0.

In Mode 5, currents from $A_0$, $A_1$, $A_1'$, $A_2$, $A_2'$, $A_3$, $A_3'$, $A_4$, $A_4'$, $A_5$, and $A_5'$ return to $A_6$ and $A_6'$. To accomplish focusing in this mode, the voltage differences of $(VM_1+VM_1')-(VM_2+VM_2')$, $(VM_3+VM_3')-(VM_4+VM_4')$, $(VM_5+VM_5')-(VM_6+VM_6')$, $(VM_7+VM_7')-(VM_8+VM_8')$ and $(VM_9+VM_9')-(VM_{10}+VM_{10}')$ are set to 0.

Thus, as the mode number increases, emitted currents return to return electrodes that are further away from the source, providing a deeper investigation of the formation.

An Example Method

As mentioned previously, a 1D formation model with invasion is commonly used in modeling resistivity tools, and in inverting the data obtained from such tools. The 1D model is simple and generally accurate, especially for thick beds. When this model is used, it is generally assumed that the invasion has a step profile, although other invasion profiles (e.g., linear) may be used in the inversion process as well. This type of assumption will be illustrated and described in the following paragraphs.

Figure 4:
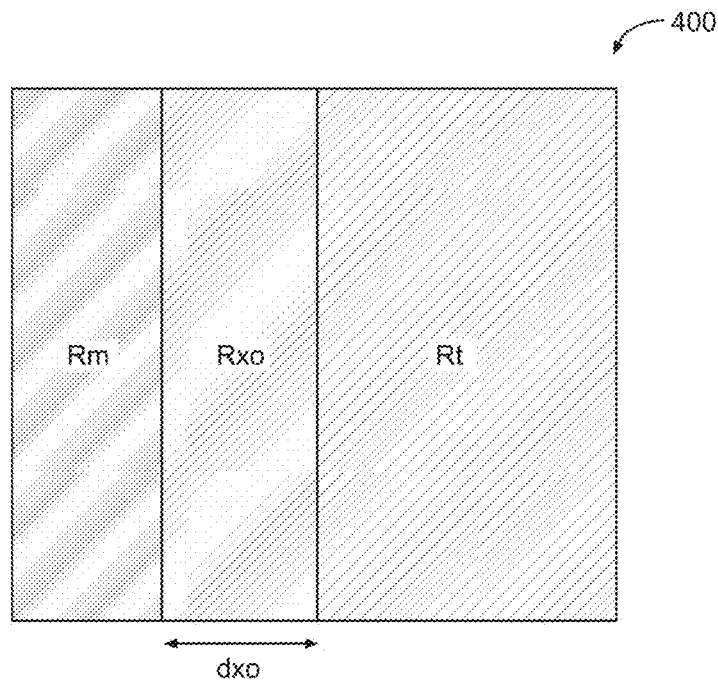
FIG. 4 is a side, cut-away view of a 1D formation with a step invasion profile, according to various embodiments of the invention.

FIG. 4 is a side, cut-away view of a 1D formation 400 with a step invasion profile, according to various embodiments of the invention. The step invasion profile provides a constant invasion resistivity for a given invasion radius.

The inversion process involves taking the measured apparent resistivities provided by a resistivity tool, and matching them to the apparent resistivities generated by a forward model of the formation, using an assumed profile (e.g., the step invasion profile shown in FIG. 4). Parameters that produce the best match between the measured apparent resistivities and the apparent resistivities produced by the forward model (known to those of ordinary skill in the art as reconstructed apparent resistivities) are returned as outputs.

For each focused mode, the apparent resistivity computed from the forward model is defined as follows:

$$Ra_i^f = \frac{VM_1^i}{IA_0^i},$$

where $VM_1^i$ is the voltage of monitor electrode M1 for mode I, and where $IA_0^i$ is the current emitted by electrode $A_0$ for mode i. The best match between the measured apparent resistivities and the forward-modeled apparent resistivities is determined by the minimization of some property of a cost function vector, such as the norm, or the square of the norm. In some embodiments, the cost function vector comprises the difference between measured and reconstructed apparent resistivities.

As is known to those of ordinary skill in the art, a variety of techniques exist to perform numerical inversion, most of which are well-documented in the literature. The techniques described herein are applicable to any such method, including those that implement a table look-up or an iterative solution. Thus, for simplicity and ease of understanding, the following examples use of an iterative solution based on the well-known Levenberg-Marquardt algorithm.

In a practical application, the presence of noise, shoulder bed effects, radial variations in addition to those used in the model, and other elements affect the accuracy of the inversion. Thus, to obtain results that are accurate as well as visually satisfying in many cases where such effects are present, regularization is used. In these cases, regularization is applied by adding additional terms to the cost function that represents the desired constraints on the inversion results, to find the most useful solution within the desired constraints.

One form of the cost function vector used in the inversion applied to the examples that follow is shown in equation 2. Here, as noted earlier, $Ra^f$ denotes the apparent resistivities computed from the forward model.

$$\left\{ \begin{array}{l} \left|\frac{Ra1 - Ra1^f}{Ra1}\right| \times \frac{weight^1}{\sum_i weight^i} \\ \left|\frac{Ra2 - Ra2^f}{Ra2}\right| \times \frac{weight^2}{\sum_i weight^i} \\ \left|\frac{Ra3 - Ra3^f}{Ra3}\right| \times \frac{weight^3}{\sum_i weight^i} \\ \left|\frac{Ra4 - Ra4^f}{Ra4}\right| \times \frac{weight^4}{\sum_i weight^i} \\ \left|\frac{Ra5 - Ra5^f}{Ra5}\right| \times \frac{weight^5}{\sum_i weight^i} \\ \frac{|dxo|^{\frac{1}{4}}}{\gamma^c} \\ \theta^c \times \left|\log_{10}\left(\frac{Rt}{Rxo}\right)\right|^{\frac{1}{4}} \end{array} \right\} \quad \text{Equation (2)}$$

The weights $weight^1$-$weight^5$ of the apparent resistivities in the cost function are most often used for borehole correction. However, they may also be used to increase the effect of one or more apparent resistivities with respect to others in the inversion.

The last two terms in the vector of Equation (2) are used for regularization, to minimize the effect of the invasion. $\gamma^c$ and $\theta^c$ are regularization weights determined by the separation of borehole-corrected apparent resistivities as will be described later in this section. Again, it is noted that although the example given here is directed to the use of an array laterolog tool, various embodiments that make use of the cost function shown in Equation (2) can easily be extended to other resistivity tools, including array induction tools.

In most embodiments, the process of inversion is used to provide solutions for both invaded and non-invaded conditions. In the example that follows, the solution for an invaded condition uses the step invasion profile shown in FIG. 4, while the solution for the non-invaded condition assumes a radius of invasion (dxo) of zero.

First, a borehole correction is applied. This is accomplished by setting the weight of all apparent resistivities to zero, except the apparent resistivity to which the borehole correction is applied. A non-invaded profile is assumed, and solved for Rt. This inverted value of Rt is the borehole-corrected apparent resistivity for that mode. This correction procedure is repeated for all five modes.

Note that in the non-invaded inversion, regularization terms are meaningless and set to zero. After borehole correction, a full inversion of the noninvaded model is also solved. This is followed by an inversion of the invaded profile.

The final solution arises from a combination of the invaded and non-invaded condition inversion solutions. The weight of each solution (invaded and non-invaded) in the final result can be calculated using the pseudo-code of Equation (3), where the borehole-corrected apparent resistivities for different operational modes is denoted by RaBC. "std" denotes the standard deviation for RaBC, and "max" denotes the maximum value of RaBC.

If $std(RaBC)/max(RaBC) < Thresh1$ winv=1

Else if $(std(RaBC)/max(RaBC) >= Thresh1)$ and $(std(RaBC)/max(RaBC) < Thresh2)$ winv=1−1/(Thresh2−Thresh1)×($std(RaBC)$/max$(RaBC)$−Thresh1)

Else winv=0

End          Equation (3)

In Equation (3), a linear transition between the invaded and non-invaded solution is assumed, where the transition is based on the separation of borehole corrected resistivities. The quality of this transition is a useful physical indicator of invasion. When borehole-corrected apparent resistivities for different modes with different depths of investigation stack up in an orderly fashion it means that little or no radial variation in the formation exists. On the other hand, if they are widely separated in value, invasion of the formation is indicated. This formulation of Equation (3) is useful in some embodiments. In others, other types of transitions, such as a logarithmic (instead of linear) transition between the solutions may be more appropriate.

In some embodiments, the regularization constants $\gamma^c$ and $\theta^c$ also depend on the separation of borehole corrected apparent resistivities. This can be taken into consideration as follows $$\theta^c = \theta/(std(RaBC)/\max(RaBC) + \theta^{offset})^2$$

$$\gamma^c = \gamma \times (std(RaBC)/\max(RaBC) + \gamma^{offset})^2 \quad \text{Equation (4)}$$

Here $\theta$, $\gamma$, $\theta^{offset}$, and $\gamma^{offset}$ are constants that can be adjusted to optimize the measurement results for a specific tool. Thus, the presence of these terms in the cost function becomes clear: the last two terms of the cost function become very small when invasion is present and the borehole corrected apparent resistivities are highly separated. However, these two terms become dominant and force the invasion radius to zero, with Rxo approximately equal to Rt when the borehole-corrected apparent resistivities transition in a more orderly fashion, indicating that invasion is not present.

Other constraints on inversion products, based on the separation of borehole corrected resistivities, may be applied via Equation (5). For example, a constraint may be applied to Rt during the inversion, helping to ensure that only formation resistivities having a reasonable relation to borehole-corrected resistivities are searched during the inversion process.

$$Rt >= \min(RaBC) \times \frac{\min(RaBC)}{\max(RaBC)} \ \& \ Rt <= \quad \text{Equation (5)}$$

$$\max(RaBC) \times \left(\frac{\max(RaBC)}{\min(RaBC)}\right)^2$$

$$Rxo >= \frac{(Rxo^{old})}{Rxorate \times |Depth_{current} - Depth_{old}|} \ \& \ Rxo <=$$

$$Rxo^{old} \times Rxorate \times |Depth_{current} - Depth_{old}|$$

$$dxo >= dxo^{old} - dxorate \times |Depth_{current} - Depth_{old}| \ \&$$

$$dxo <= dxo^{old} + dxorate \times |Depth_{current} - Depth_{old}|$$

Other constraints may also be applied. For example, limits may be imposed on Rxo and dxo to prevent impossible physical changes from appearing as results in their inverted values. Thus, limits on Rxo and dxo may also be described in Equation (5). In this case, the values of Rxo and dxo are forced to reside within a specified interval that is determined by their values obtained at a prior logging point. These prior values are denoted by superscript "old". The rate of change is determined by Rxorate (for Rxo) and dxorate (for dxo) times the depth difference between current and previous logging points, denoted as $Depth_{current}$ and $Depth_{old}$, respectively. In this way, the limits have little effect when logging points are relatively far away from each other.

Figure 5:
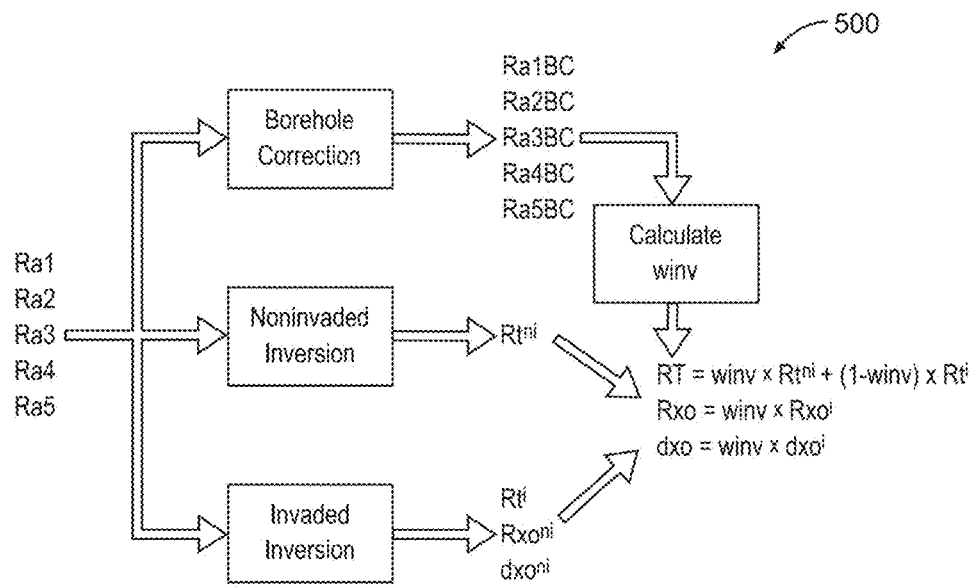
FIG. 5 is a flow diagram illustrating several methods, according to various embodiments of the invention.

FIG. 5 is a flow diagram 500 illustrating several methods, according to various embodiments of the invention. This diagram 500 serves as a summary, schematic representation of the inversion process for some embodiments described in this document. In the inversion example illustrated, caliper and mud resistivity are assumed to be known, and tool is substantially centered in the borehole. In some embodiments, caliper, mud resistivity, and the position of the tool in the borehole can also be inverted.

Inversion Examples

To demonstrate the effectiveness of inversion, results from two different synthetic cases that represent examples of invaded and non-invaded formations will be considered. The Levenberg-Marquardt algorithm, as an iterative inversion technique, is used to produce the illustrated solutions, although as noted previously, the conclusions that are reached are equally applicable when other inversion methods are used. The number of iterations performed was two-hundred for each logging point.

Non-Invaded Formation Example

Figure 6:
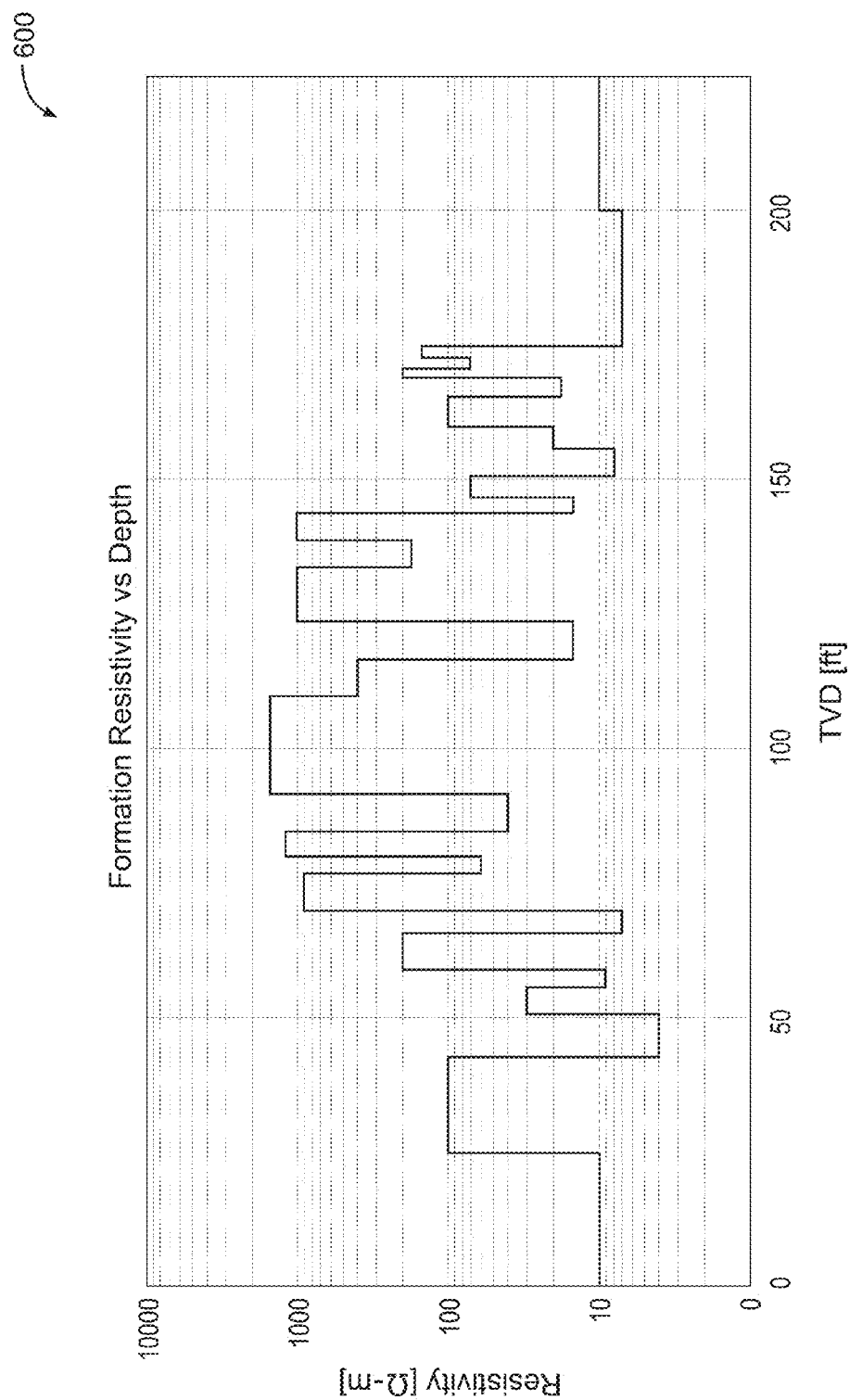
FIG. 6 is a graph illustrating formation resistivity (Rt) vs. depth (TVD) for an example non-invaded formation, according to various embodiments of the invention.

FIG. 6 is a graph 600 illustrating formation resistivity (Rt) vs. depth (TVD) for an example non-invaded formation, according to various embodiments of the invention. In this case, the change in Rt over true vertical depth is shown.

Figure 7:
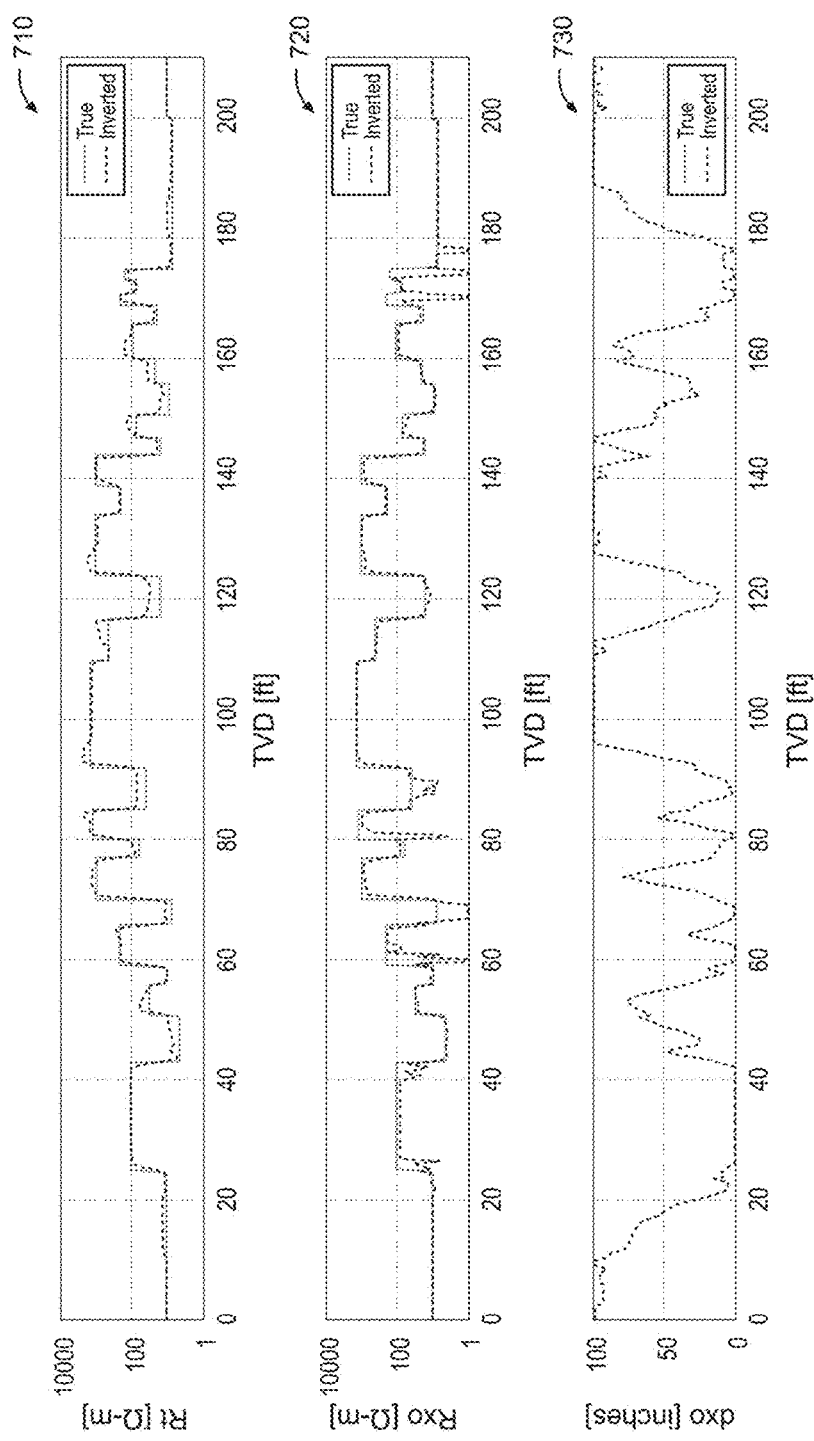
FIG. 7 illustrates the results of an inversion for the data in FIG. 6, according to traditional methods.

FIG. 7 illustrates the results of an inversion for the data in FIG. 6, according to traditional methods. Here conventional inversion methods are used, without regularization or the combination of invaded and non-invaded formation conditions. The upper graph 710 shows the resulting inverted values for Rt, the middle graph 720 shows the resulting inverted values for Rxo, and the lower graph 730 shows the resulting inverted values for dxo. Real parameters (denoted as "True" in the graphs 710, 720, 730) are shown for reference. It is noted that although Rxo and dxo values are somewhat ambiguous for non-invaded cases, it is often commercially desirable to show values of Rxo that are close to the values of Rt, and values of dxo that are substantially equal to zero. This type of presentation is easier to interpret than otherwise. However, it can be seen the results obtained in this example, using traditional methods, fall short of what is desired. The outcome is noisy and difficult to interpret.

Figure 8:
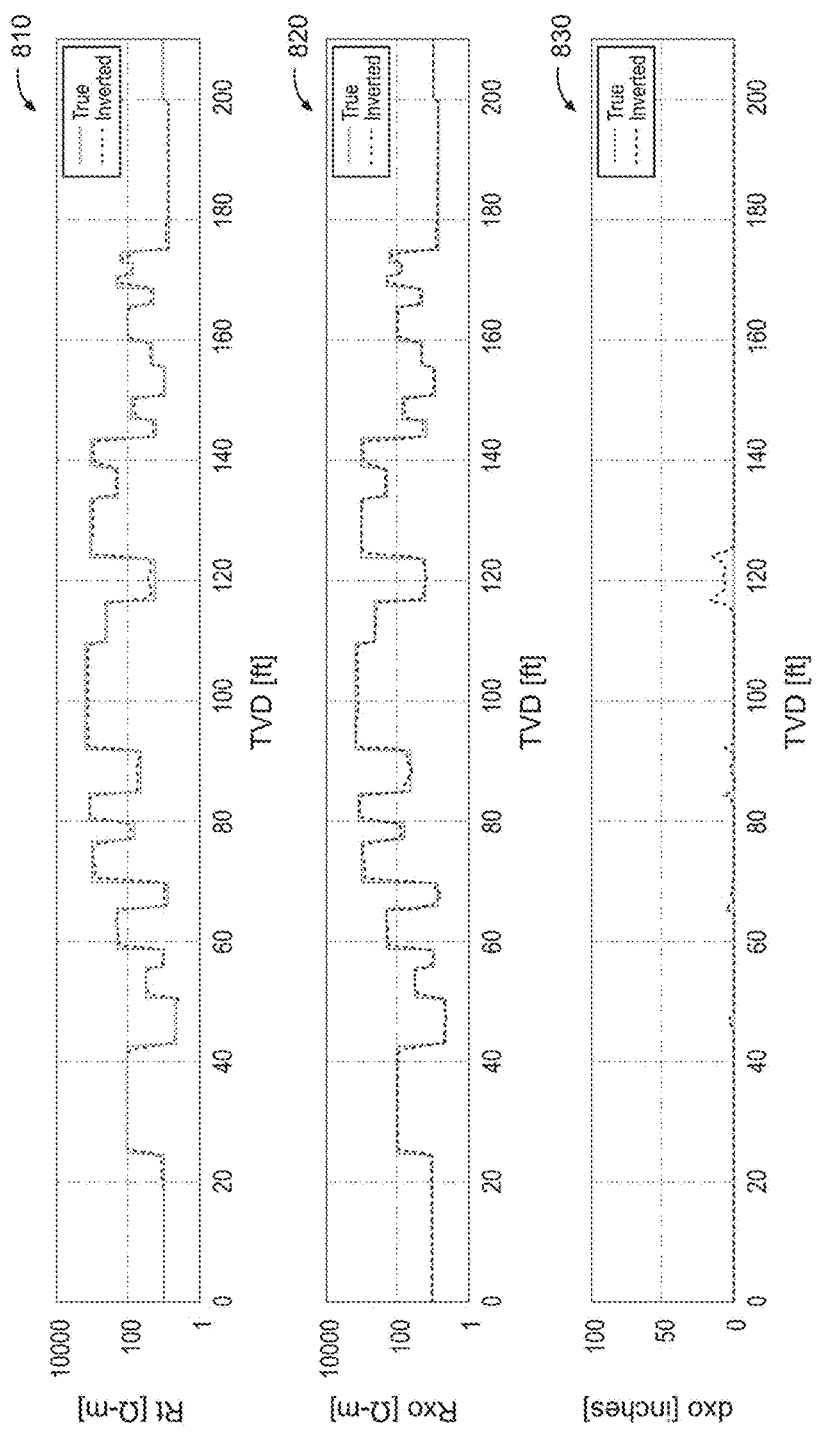
FIG. 8 illustrates the results of an inversion for the data in FIG. 6, according to various embodiments of the invention.

FIG. 8 illustrates the results of an inversion for the data in FIG. 6, according to various embodiments of the invention.

In FIG. 8, results using the method described in this disclosure are shown. In this case, the upper graph 810 shows the resulting inverted values for Rt, the middle graph 820 shows the resulting inverted values for Rxo, and the lower graph 830 shows the resulting inverted values for dxo. Real parameters (denoted as "True" in the graphs 810, 820, 830) are again shown for reference. As a matter of contrast with the prior figure, the inverted results in this case are much closer to the real parameters. Noise-like behavior is largely eliminated, and logs of the inverted parameters are easier to interpret. Perfect reconstruction is not reasonable to expect, since the inversion model is 1D, while the log is two-dimensional (2D). In other words, the log contains variations in depth direction, and a finite number of numerical iterations are applied. Even so, the outcome is far more appealing in a commercial sense.

Invaded Formation Example

Figure 9:
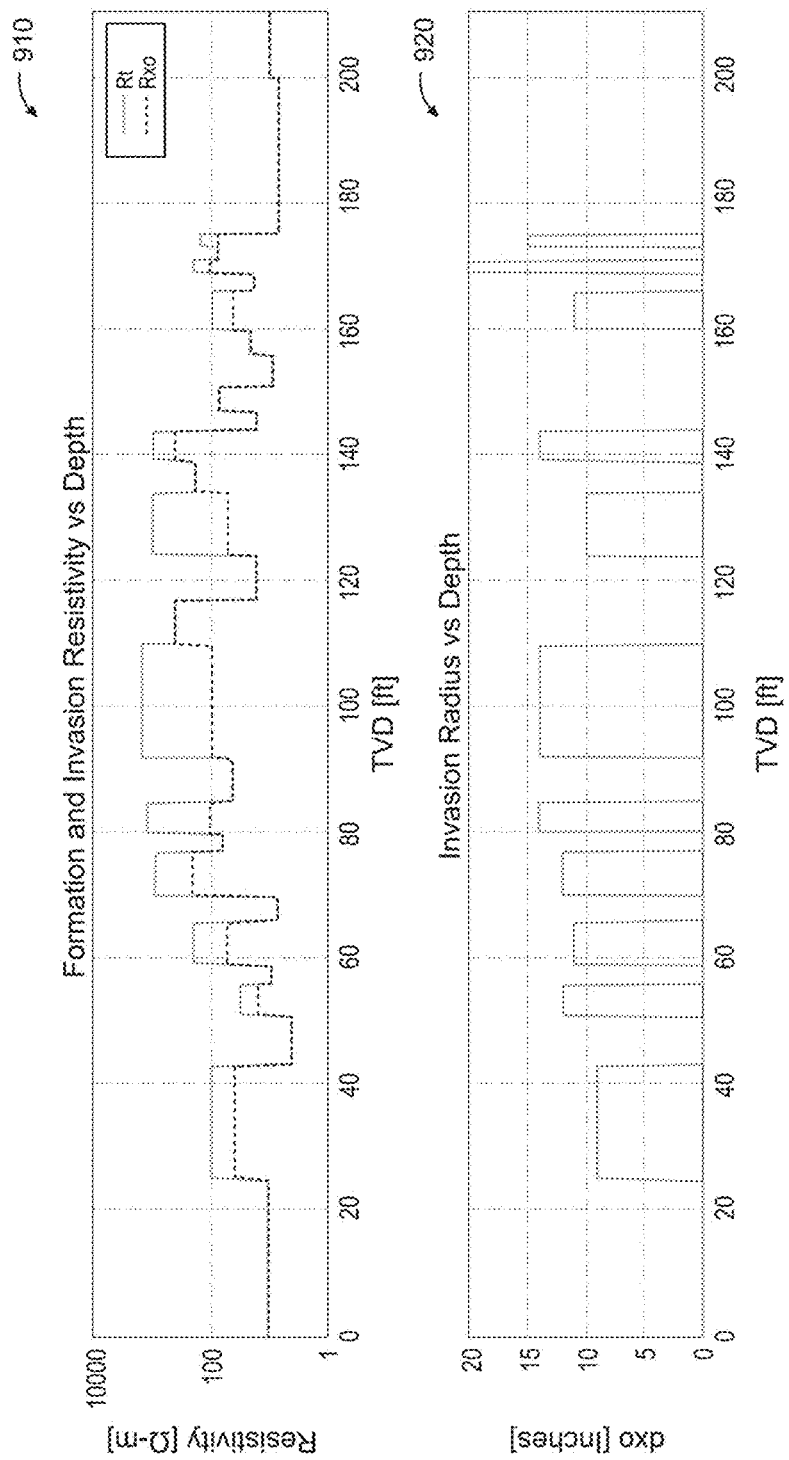
FIG. 9 illustrates graphs of formation resistivity (Rt) and invasion radius (dxo) vs. depth (TVD), respectively, for an example invaded formation, according to various embodiments of the invention.

FIG. 9 illustrates graphs 910, 920 of formation resistivity (Rt) and invasion radius (dxo) vs. depth (TVD), respectively, for an example invaded formation, according to various embodiments of the invention. In this case, the upper graph 910 shows Rt and Rxo overlaid on each other, versus true depth. The lower graph 920 shows the invasion radius versus true depth. Here, invaded regions are interspersed with non-invaded regions. As a result, this case represents a more difficult inversion problem than the non-invaded (previous) example.

Figure 10:
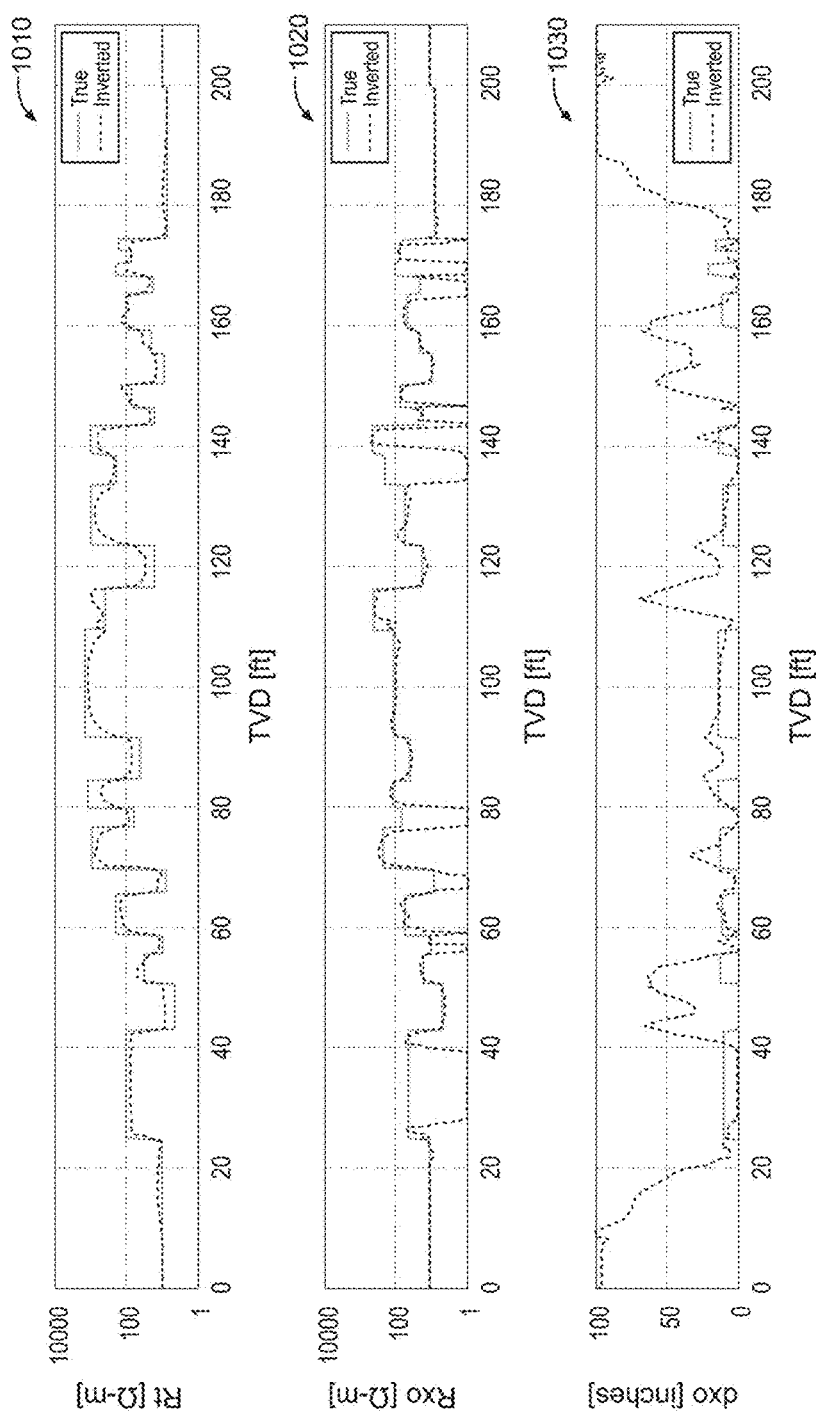
FIG. 10 illustrates the results of an inversion for the data in FIG. 9, according to traditional methods.

FIG. 10 illustrates the results of an inversion for the data in FIG. 9, according to traditional methods. Here conventional inversion methods are used, without regularization or the combination of invaded and non-invaded formation conditions. The upper graph 1010 shows the resulting inverted values for Rt, the middle graph 1020 shows the resulting inverted values for Rxo, and the lower graph 1030 shows the resulting inverted values for dxo. Real parameters (denoted as "True" in the graphs 1010, 1020, 1030) are shown for reference.

These results are conspicuous for the degree of error shown. In particular, the inverted values for Rxo and dxo exhibit large variations from the real values. Thus, these inversion results are inaccurate and noisy.

Figure 11:
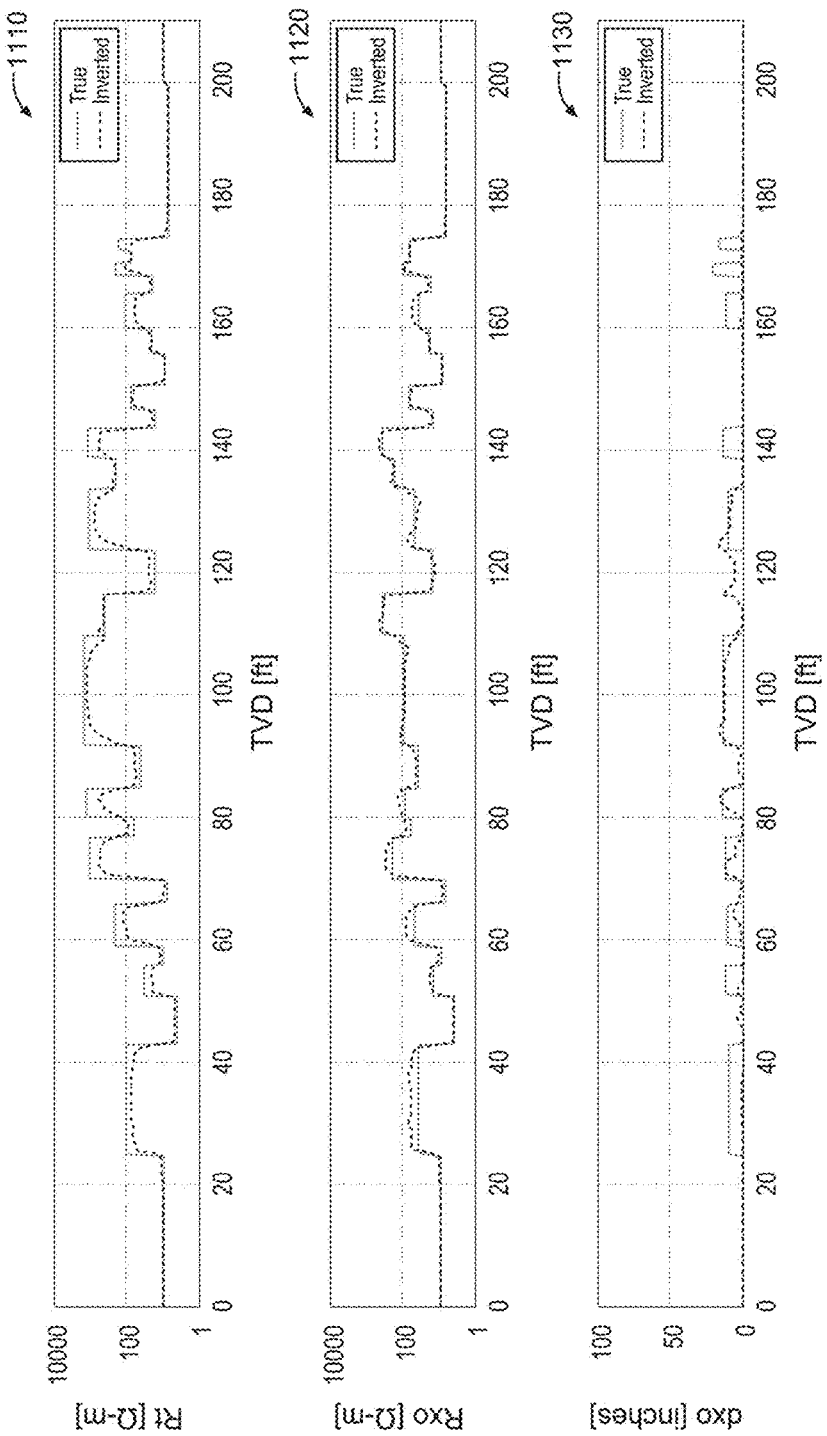
FIG. 11 illustrates the results of an inversion for the data in FIG. 9, according to various embodiments of the invention.

FIG. 11 illustrates the results of an inversion for the data in FIG. 9, according to various embodiments of the invention. As before, the upper graph 1110 shows the resulting inverted values for Rt, the middle graph 1120 shows the resulting inverted values for Rxo, and the lower graph 1130 shows the resulting inverted values for dxo. Real parameters (denoted as "True" in the graphs 1110, 1120, 1130) are shown for reference.

Even though this case represents a difficult problem, and the outcome is not perfect, the inverted values are closer to the real values than what is obtained using conventional inversion methods. Large variations in the values are not present, and the end result is much easier to interpret. In short, the process is improved to a noticeable degree. Still further embodiments may be realized.

Apparatus and Systems

Figure 12:
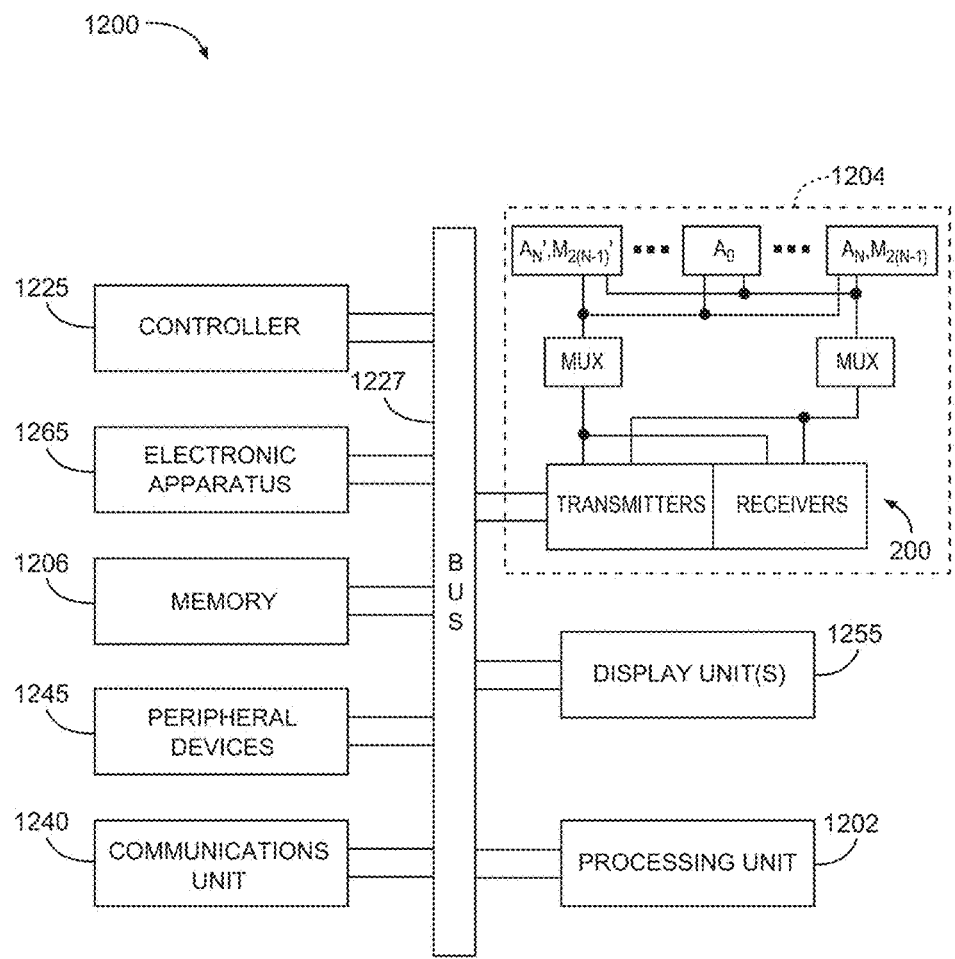
FIG. 12 is a block diagram of systems and apparatus according to various embodiments of the invention.

For example, FIG. 12 is a block diagram of systems 1200 and apparatus 1210 according to various embodiments of the invention. Here the 2N guard electrodes ($A_1, A_1', \ldots, A_N, A_N'$) and 4N−4 monitor electrodes ($M_1, M_1', M_2, M_2', \ldots, M_{2(N-1)}, M_{2(N-1)}'$) correspond to the same or similar elements shown in the array of FIG. 2, forming part of a laterolog array tool 200. One or more multiplexer units MUX may be included in the tool 200, as well as one or more transmitter/receiver/transceiver units TRANSMITTERS and RECEIVERS, respectively comprising one or more transmitters and/or receivers, and combinations thereof. The processing unit 1202 may comprise a resistivity signal processor.

Here it can be seen that the processing unit 1202 can form part of the system 1200 to control the acquisition and processing of resistivity measurements within the system 1200, using apparatus 1210. In some embodiments, a logging system 1200 comprises one or more of the tools 1210, including a housing 1204. The housing 1204 might take the form of a wireline tool body, or a downhole tool as described in more detail below with reference to FIGS. 14 and 15. The processing unit 1202 may be part of a surface workstation or attached to the housing 1204.

The system 1200, which may comprise a logging system, can include a controller 1225, other electronic apparatus 1265, and a communications unit 1240. The controller 1225 and the processing unit 1202 can be fabricated to operate one or more components of the apparatus 1210 to acquire measurement data, such as resistivity measurements.

Electronic apparatus 1265 (e.g., electromagnetic sensors, etc.) can be used in conjunction with the controller 1225 to perform tasks associated with taking resistivity measurements downhole. The communications unit 1240 can include downhole communications in a drilling operation. Such downhole communications can include telemetry.

The system 1200 can also include a bus 1227 to provide common electrical signal paths between the components of the logging system 1200. The bus 1227 can include an address bus, a data bus, and a control bus, each independently configured. The bus 1227 can also use common conductive lines for providing one or more of address, data, or control, the use of which can be regulated by the controller 1225.

The bus 1227 can include instrumentality for a communication network. The bus 1227 can be configured such that the components of the logging system 1200 are distributed. Such distribution can be arranged between downhole components such as the apparatus 100 and system 500, and components that can be disposed on the surface of a well. Alternatively, several of these components can be co-located, such as on one or more collars of a drill string or on a wireline structure.

In various embodiments, the logging system 1200 includes peripheral devices that can include displays 1255, additional storage memory, or other control devices that may operate in conjunction with the controller 1225 or the processing unit 1202. The display 1255 can display diagnostic information for the system 500 based on the signals generated according to embodiments described above. The display 1255 can also be used to display one or more sensitivity plots 300, similar to or identical to what is illustrated in FIG. 3.

In an embodiment, the controller 1225 can be fabricated to include one or more processors. The display 1255 can be fabricated or programmed to operate with instructions stored in the processing unit 1202 (for example in the memory 1206) to implement a user interface to manage the operation of the system 500 or components distributed within the logging system 1200. This type of user interface can be operated in conjunction with the communications unit 1240 and the bus 1227. Various components of the logging system 1200 can be integrated with the system 500 or the associated housing such that processing identical to or similar to the methods discussed with respect to various embodiments herein can be performed downhole.

In various embodiments, a non-transitory machine-readable storage device can include instructions stored thereon, which, when performed by a machine, cause the machine to become a customized, particular machine that performs operations comprising one or more activities similar to or identical to those described with respect to the methods and techniques described herein. A machine-readable storage device, herein, is a physical device that stores information (e.g., instructions, data), which when stored, alters the physical structure of the device. Examples of machine-readable storage devices include, but are not limited to, memory 1206 in the form of read only memory (ROM), random access memory (RAM), a magnetic disk storage device, an optical storage device, a flash memory, and other electronic, magnetic, or optical memory devices, including combinations thereof.

The physical structure of stored instructions may thus be operated on by one or more processors such as, for example, the processing unit 1202. Operating on these physical structures can cause the machine to perform operations according to methods described herein. The instructions can include instructions to cause the processing unit 1202 to store associated data or other data in the memory 1206. The memory 1206 can store the results of measurements of formation parameters or parameters of the system 500, to include gain parameters, calibration constants, identification data, etc. The memory 1206 can store a log of the NMR measurements and resistivity measurements obtained by the system 500. The memory 1206 therefore may include a database, for example a relational database.

Thus, referring to FIGS. 1-12, it can be seen that many embodiments may be realized. For example, a system 1200 may comprise a tool (e.g., apparatus 1210) to make resistivity measurements in a geological formation, and a processing unit 1202 to process the results and determine true resistivity values for the formation.

In some embodiments, a system 1200 comprises at least one tool (e.g., apparatus 1210) configured to measure resistivity in a geological formation as measured resistivity data. The system 1200 further comprises a processing unit 1202 coupled to the at least one tool to receive the measured resistivity data, and to correct the measured resistivity data for borehole effects to provide borehole-corrected apparent resistivity data for a non-invaded formation. The processing unit 1202 may further operate, to invert the measured resistivity data or the borehole-corrected apparent resistivity data to provide non-invaded true resistivity values for the non-invaded formation, to invert the measured resistivity data to provide invaded true resistivity values for an invaded formation, and to determine true resistivity values for the geological formation as a weighted combination of the non-invaded true resistivity values and the invaded true resistivity values, as shown by the examples above.

The system 1200 may include a bit steering mechanism. Thus, in some embodiments, the system 1200 comprises a bit steering mechanism (e.g., taking the form of a controller 1225) to operate in response to the true resistivity values determined by the processing unit 1202, to control drilling operations in the geological formation.

The tool in the system may be a laterolog tool. Thus, in some embodiments, the at least one tool comprises an array laterolog tool.

A monitor may operate to keep track of transitions from invaded to non-invaded regions of the formation, and perhaps, to indicate those transitions via a display, alarm, etc. Thus, in some embodiments, the system 1200 may comprise a monitor (e.g., as one of the display units 1255) to indicate transitions from invaded to non-invaded regions of the geological formation, based on the true resistivity values determined by the processing unit.

The apparatus 1210, system 1200, and each of their elements may all be characterized as "modules" herein. Such modules may include hardware circuitry, and/or a processor and/or memory circuits, software program modules and objects, and/or firmware, and combinations thereof, as desired by the architect of the apparatus 1210 and systems 1200, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, a formation imaging package, an energy detection and measurement package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 1210 and systems 1200 are intended to provide a general understanding of the structure of various embodiments, and they are not intended to serve as a complete description of all the elements and features of apparatus and systems that might make use of the structures described herein. For example, some embodiments include a number of methods, which will now be described.

Additional Methods

Figure 13:
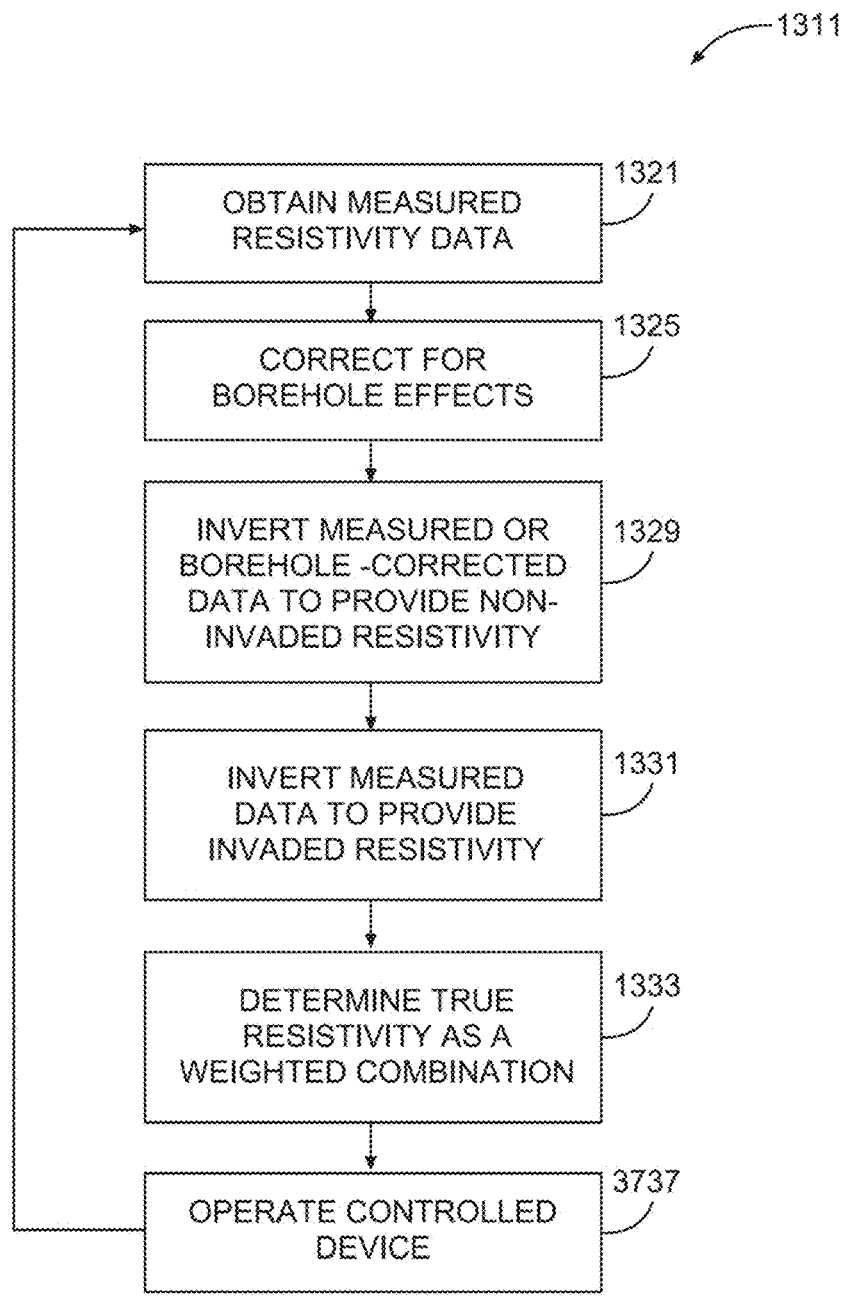
FIG. 13 is a flow chart illustrating additional methods according to various embodiments of the invention.

FIG. 13 is a flow chart illustrating additional methods according to various embodiments of the invention. The methods 1311 may comprise processor-implemented methods, to execute on one or more processors that perform the methods. For example, one embodiment of the methods 1311 may begin at block 1325 with correcting measured values to get apparent resistivity for a non-invaded formation, and then move on to blocks 1329 and 1331 with inverting the apparent resistivity to get true resistivity for the non-invaded formation, and inverting the measured values to get true resistivity for the invaded formation, respectively. In some embodiments, a method includes, at block 1333, determining true resistivity for the geological formation using a weighted combination of the results from each of the separate inversions. Other embodiments may be realized.

For example, resistivity measurements can be gathered during wireline or drilling operations. Thus, some embodiments of the method 1311 begin at block 1321 with obtaining measured resistivity data from a geological formation during wireline or drilling operations. Some embodiments of the method 1311 continue on to block 1325 to include correcting the measured resistivity data for borehole effects to provide borehole-corrected apparent resistivity data for a non-invaded formation.

In some embodiments, a method 1311 includes, at block 1329, inverting the measured resistivity data or the borehole-corrected apparent resistivity data to provide non-invaded true resistivity values for the non-invaded formation. Using Equation (5), some values, such as values of Rt, can be constrained. Thus, in some embodiments, the activity at block 1329 comprises constraining a range of the non-invaded true resistivity values according to values of the borehole-corrected apparent resistivity data.

In some embodiments, the method 1311 comprises, at block 1331, inverting the measured resistivity data to provide invaded true resistivity values for an invaded formation. Values of Rxo and dxo can be determined as part of the same inversion that is used to determine the invaded true resistivity values. Thus, in some embodiments, the activity at block 1331 comprises determining invasion zone resistivity values and invasion radius values while inverting the measured resistivity data using weights applied to calculate the invaded true resistivity values.

Using Equation (5), the values of Rxo and dxo can be constrained in a number of ways. Thus, in some embodiments, the activity at block 1331 comprises constraining a range of the invasion zone resistivity values and the invasion radius values according to prior determined true resistivity values and rates of change.

For example, using Equation (5)5, the values of Rxo and dxo can be constrained via rates of change that are constant: Rxorate and dxorate. Thus, in some embodiments, the rates of change comprise constant rates of change associated with the invasion zone resistivity values and the invasion radius values, respectively.

In another example of using Equation (5), the values of Rxo and dxo can be constrained via rates of change that vary with the difference in depth between measurements: Depth (current)–Depth(old). Thus, in some embodiments, the rates of change vary according to a difference in logging point depth.

Regularization weights, and associated constants, can be applied during the inversion that produces the invaded true resistivity values. Thus, in some embodiments, inverting the measured resistivity data at block 1331 further comprises applying regularization constants within a cost function vector.

The regularization constants can be determined by a ratio of borehole-corrected apparent resistivity data. Thus, in some embodiments, the regularization constants are determined by a ratio of standard deviation and maximum values for the borehole-corrected apparent resistivity data.

The regularization constants can also be determined by the type of tool used to make the original resistivity measurements. That is, the regularization constants are determined by constant offsets associated with a tool type used to obtain the measured resistivity data. For example, in some embodiments, values for the constants associated with a laterolog array tool vary over approximately the following ranges: 1e-5<θ<1e-3; 1e3<γ<1e6; 1e-5<γoffset; and θoffset<5e-1.

A specific form of cost function may be used in some embodiments. Thus, when inverting the measured resistivity data to provide the invaded true resistivity values for the invaded formation, the activity at block 1331, may comprise applying a cost function vector of the form $$\left\{ \begin{array}{l} \left| \dfrac{Ra1 - Ra1^f}{Ra1} \right| \times \dfrac{weight^1}{\sum_i weight^i} \\ \left| \dfrac{Ra2 - Ra2^f}{Ra2} \right| \times \dfrac{weight^2}{\sum_i weight^i} \\ *** \\ \left| \dfrac{Ran - Ran^f}{Ran} \right| \times \dfrac{weight^n}{\sum_i weight^i} \\ \dfrac{|dxo|^{\frac{1}{4}}}{\gamma^c} \\ \theta^c \times \left| \log_{10}\left(\dfrac{Rt}{Rxo}\right) \right|^{\frac{1}{4}} \end{array} \right\}$$

wherein i=a number of resistivity measurement tool operating modes, Ran=an apparent resistivity measured using mode n of the operational modes, $Ran^f$=an apparent resistivity obtained from a forward model, $weight^i$=a weighting value constant corresponding to operational mode i, dxo=an invasion radius obtained from the forward model, $\gamma^c$=a regularization constant associated with the invasion radius, $\theta^c$=a regularization constant associated with true resistivity, Rt=the true resistivity, and Rxo=an invasion resisitivity.

In some embodiments, the method 1311 continues on block 1333 with determining true resistivity values for the geological formation associated with the measured resistivity data as a weighted combination of the non-invaded true resistivity values and the invaded true resistivity values. As noted previously, the invasion radius and invasion resistivity can also be weighted.

The non-invaded and invaded true resistivity values can be combined to produce the true resistivity values for the geological formation in a number of ways. Thus, in some embodiments, the activity at block 1333 comprises determining the weighted combination as one of a linear combination or a logarithmic combination.

In another example, the non-invaded and invaded true resistivity values can be combined according to threshold values. Thus, in some embodiments, the activity at block 1333 comprises determining the weighted combination by applying upper and lower threshold values associated with a ratio of the borehole-corrected apparent resistivity values.

The method 1311 may continue on to include, at block 1337, operating a controlled device according to the true resistivity values for the geological formation. For example, the geological formation true resistivity values that result from executing the activities in the method 1311 can be used to control drilling operations. Thus, in some embodiments, operating the controlled device at block 13337 further comprises controlling drilling operations in the geological formation based on the true resistivity values for the geological formation.

The geological formation true resistivity values can be used to steer the bit. Thus, in some embodiments, controlling the drilling operations at block 1337 comprises operating a geosteering device to select a drilling direction in the geological formation, based on the true resistivity values for the geological formation.

The true resistivity values can be published for viewing, perhaps in the form of 2D or three-dimensional (3D) graphs. Thus, in some embodiments, operating the controlled device at block 1337 comprises publishing at least some of the true resistivity values for the geological formation in a human-readable form.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 5 and 13) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Additional Systems

Figure 14:
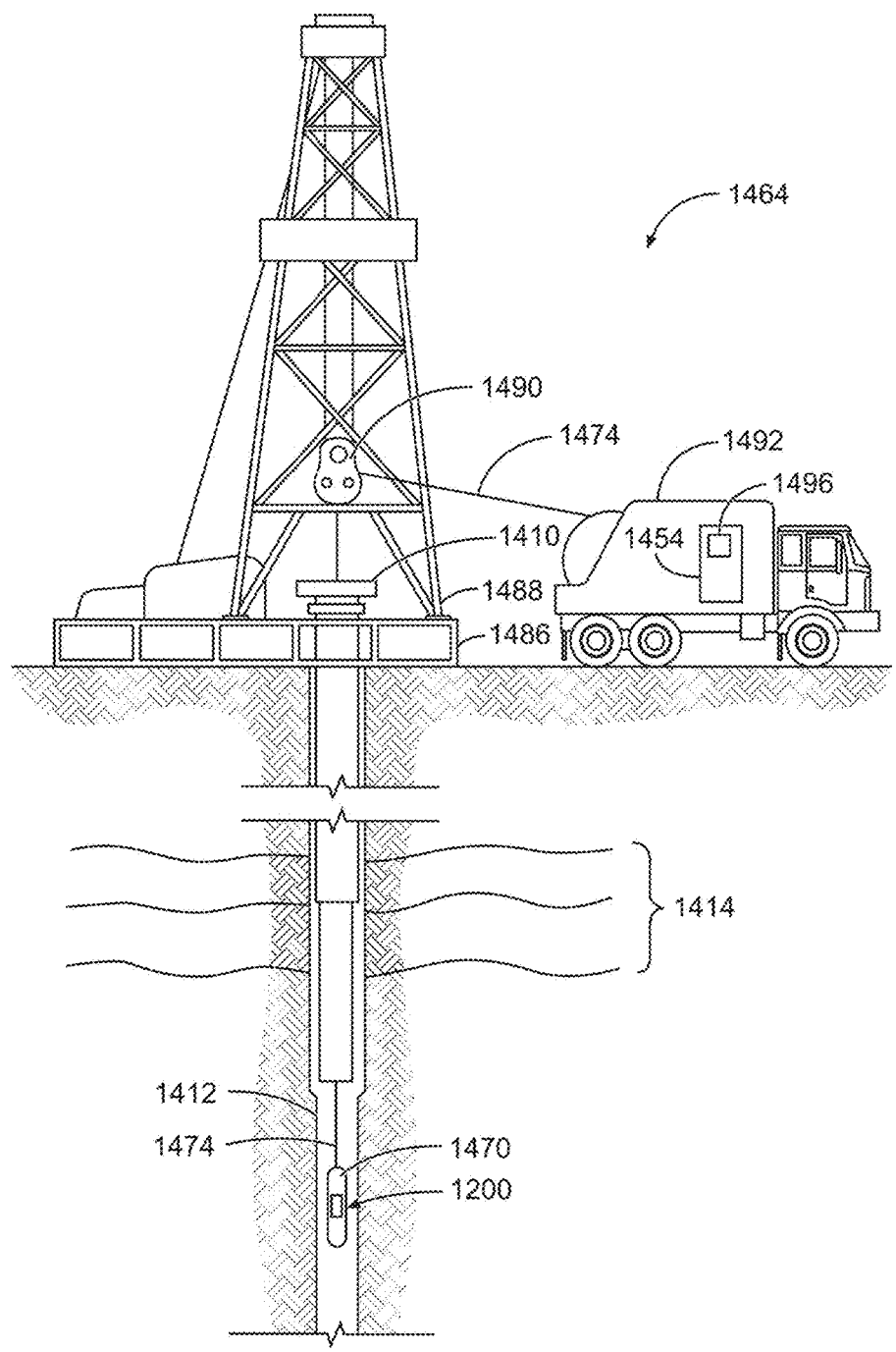
FIG. 14 illustrates a wireline system embodiment of the invention.
Figure 15:
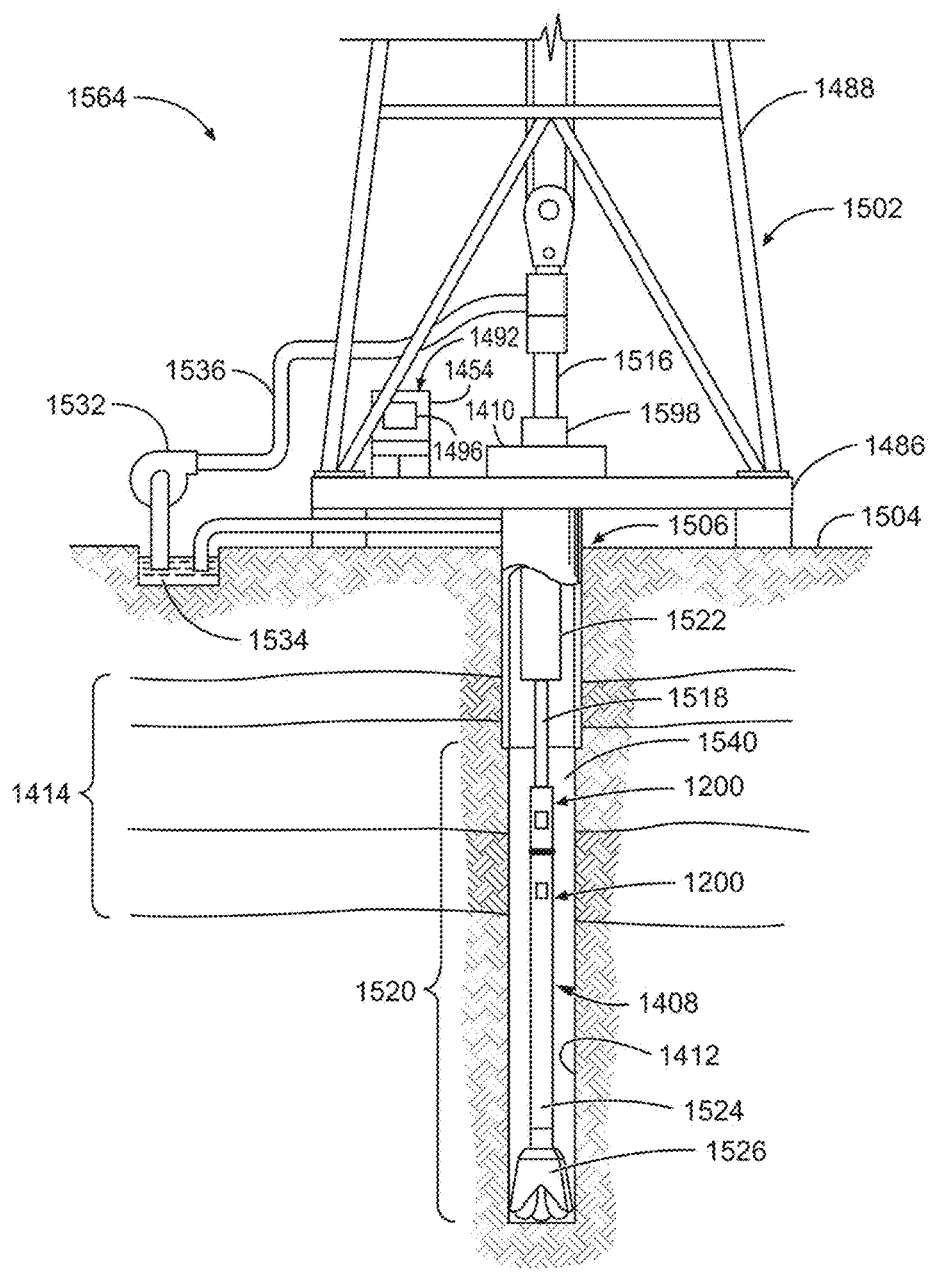
FIG. 15 illustrates a drilling rig system embodiment of the invention.

For example, FIG. 14 illustrates a wireline system embodiment of the invention. FIG. 15 illustrates a drilling rig system embodiment of the invention. Therefore, the systems 1464, 1564 may comprise portions of a wireline logging tool body 1470 as part of a wireline logging operation, or of a downhole tool 1524 as part of a downhole drilling operation. The systems 1464 and 1564 may include any one or more elements of the apparatus 1210 and systems 1200 shown in FIG. 12.

Thus, FIG. 14 shows a well during wireline logging operations. In this case, a drilling platform 1486 is equipped with a derrick 1488 that supports a hoist 1490.

Drilling oil and gas wells is commonly carried out using a string of drill pipes connected together so as to form a drilling string that is lowered through a rotary table 1410 into a wellbore or borehole 1412. Here it is assumed that the drilling string has been temporarily removed from the borehole 1412 to allow a wireline logging tool body 1470, such as a probe or sonde, to be lowered by wireline or logging cable 1474 into the borehole 1412. Typically, the wireline logging tool body 1470 is lowered to the bottom of the region of interest and subsequently pulled upward at a substantially constant speed.

During the upward trip, at a series of depths, various instruments included in the tool body 1470 may be used to perform measurements (e.g., made by the apparatus 1210 shown in FIG. 12) on the subsurface geological formations 1414 adjacent the borehole 1412 (and the tool body 1470). The borehole 1412 may represent one or more offset wells, or a target well.

The measurement data can be communicated to a surface logging facility 1492 for processing, analysis, and/or storage. The logging facility 1492 may be provided with electronic equipment for various types of signal processing, which may be implemented by any one or more of the components of the system 1200 in FIG. 12. Similar formation evaluation data may be gathered and analyzed during drilling operations (e.g., during logging while drilling operations, and by extension, sampling while drilling).

In some embodiments, the tool body 1470 is suspended in the wellbore by a wireline cable 1474 that connects the tool to a surface control unit (e.g., comprising a workstation 1454). The tool may be deployed in the borehole 1412 on coiled tubing, jointed drill pipe, hard wired drill pipe, or any other suitable deployment technique.

Turning now to FIG. 15, it can be seen how a system 1564 may also form a portion of a drilling rig 1502 located at the surface 1504 of a well 1506. The drilling rig 1502 may provide support for a drill string 1508. The drill string 1508 may operate to penetrate the rotary table 1410 for drilling the borehole 1412 through the subsurface formations 1414. The drill string 1508 may include a Kelly 1516, drill pipe 1518, and a bottom hole assembly 1520, perhaps located at the lower portion of the drill pipe 1518.

The bottom hole assembly 1520 may include drill collars 1522, a downhole tool 1524, and a drill bit 1526. The drill bit 1526 may operate to create the borehole 1412 by penetrating the surface 1504 and the subsurface formations 1414. The downhole tool 1524 may comprise any of a number of different types of tools including measurement while drilling tools, logging while drilling tools, and others.

During drilling operations, the drill string 1508 (perhaps including the Kelly 1516, the drill pipe 1518, and the bottom hole assembly 1520) may be rotated by the rotary table 1410. Although not shown, in addition to, or alternatively, the bottom hole assembly 1520 may also be rotated by a motor (e.g., a mud motor) that is located downhole. The drill collars 1522 may be used to add weight to the drill bit 1526. The drill collars 1522 may also operate to stiffen the bottom hole assembly 1520, allowing the bottom hole assembly 1520 to transfer the added weight to the drill bit 1526, and in turn, to assist the drill bit 1526 in penetrating the surface 1504 and subsurface formations 1414.

During drilling operations, a mud pump 1532 may pump drilling fluid (sometimes known by those of ordinary skill in the art as "drilling mud") from a mud pit 1534 through a hose 1536 into the drill pipe 1518 and down to the drill bit 1526. The drilling fluid can flow out from the drill bit 1526 and be returned to the surface 1504 through an annular area between the drill pipe 1518 and the sides of the borehole 1412. The drilling fluid may then be returned to the mud pit 1534, where such fluid is filtered. In some embodiments, the drilling fluid can be used to cool the drill bit 1526, as well as to provide lubrication for the drill bit 1526 during drilling operations. Additionally, the drilling fluid may be used to remove subsurface formation cuttings created by operating the drill bit 1526.

Thus, referring now to FIGS. 2-3, 12, and 14-15, it may be seen that in some embodiments, the systems 1464, 1564 may include a drill collar 1522, a downhole tool 1524, and/or a wireline logging tool body 1470 to house one or more apparatus 1210, similar to or identical to the apparatus 1210 described above and illustrated in FIG. 12. Any and all components of the system 1200 in FIG. 12 may also be housed by the tool 1524 or the tool body 1470.

The tool 1524 may comprise a downhole tool, such as a logging while drilling (LWD) tool or a measurement while drilling (MWD) tool. The wireline tool body 1470 may comprise a wireline logging tool, including a probe or sonde, for example, coupled to a logging cable 1474. Many embodiments may thus be realized. For example, in some embodiments, a system 1464, 1564 may include a display 1496 to present resistivity image data in a well, perhaps in graphic form. Formation and/or cement density and structure may also be displayed. Many other embodiments may be realized. Some of these will now be listed as non-limiting examples.

In some embodiments, a method comprises correcting measured resistivity data for borehole effects to provide borehole-corrected apparent resistivity data for a non-invaded formation; inverting the measured resistivity data or the borehole-corrected apparent resistivity data to provide non-invaded true resistivity values for the non-invaded formation; inverting the measured resistivity data to provide invaded true resistivity values for an invaded formation; determining true resistivity values for a geological formation associated with the measured resistivity data as a weighted combination of the non-invaded true resistivity values and the invaded true resistivity values; and operating a controlled device according to the true resistivity values for the geological formation. In some embodiments, invasion resistivity values are obtained as a weighted combination of true resistivity from the non-invaded formation model and the inverted invasion resistivity from the invaded formation model. Invasion radius values can be obtained as the inverted invasion radius from the invaded formation model, multiplied by a weighting value.

In some embodiments, operating the controlled device further comprises controlling drilling operations in the geological formation based on the true resistivity values for the geological formation. In some embodiments, controlling the drilling operations comprises operating a geosteering device to select a drilling direction in the geological formation, based on the true resistivity values for the geological formation.

In some embodiments, operating the controlled device comprises publishing at least some of the true resistivity values for the geological formation in a human-readable form.

In some embodiments, a method comprises determining the weighted combination based on the borehole-corrected apparent resistivity values, including as one of a linear combination or a logarithmic combination. In some embodiments the method comprises determining the weighted combination by applying upper and lower threshold values associated with a ratio of the borehole-corrected apparent resistivity values.

In some embodiments, a method comprises determining invasion zone resistivity values and invasion radius values while inverting the measured resistivity data to provide the invaded true resistivity values for an invaded formation.

In some embodiments, a method comprises constraining a range of the invasion zone resistivity values and the invasion radius values according to prior determined true resistivity values and rates of change. In some embodiments, the rates of change comprise constant rates of change associated with the invasion zone resistivity values and the invasion radius values, respectively. In some embodiments, the rates of change vary according to a difference in logging point depth.

In some embodiments, a method comprises constraining a range of the non-invaded true resistivity values according to values of the borehole-corrected apparent resistivity data.

In some embodiments, inverting the measured resistivity data further comprises applying regularization constants within a cost function vector. In some embodiments, the regularization constants are determined by a ratio of standard deviation and maximum values for the borehole-corrected apparent resistivity data. In some embodiments, the regularization constants are determined by constant offsets associated with a tool type used to obtain the measured resistivity data.

In some embodiments, inverting the measured resistivity data to provide the invaded true resistivity values for the invaded formation further comprises applying a cost function vector of the form $$\left\{ \begin{array}{l} \left| \dfrac{Ra1 - Ra1^f}{Ra1} \right| \times \dfrac{\text{weight}^1}{\sum_i \text{weight}^i} \\ \left| \dfrac{Ra2 - Ra2^f}{Ra2} \right| \times \dfrac{\text{weight}^2}{\sum_i \text{weight}^i} \\ *** \\ \left| \dfrac{Ran - Ran^f}{Ran} \right| \times \dfrac{\text{weight}^i}{\sum_i \text{weight}^i} \\ \dfrac{|dxo|^{\frac{1}{4}}}{\gamma^c} \\ \theta^c \times \left| \log_{10}\left(\dfrac{Rt}{Rxo}\right) \right|^{\frac{1}{4}} \end{array} \right\}$$

wherein i=a number of resistivity measurement tool operating modes, Ran=an apparent resistivity measured using mode n of the operational modes, $Ran^f$=an apparent resistivity obtained from a forward model, $weight^i$=a weighting value constant corresponding to operational mode i, dxo=an invasion radius obtained from the forward model, $\gamma^c$=a regularization constant associated with the invasion radius, $\theta^c$=a regularization constant associated with true resistivity, Rt=the true resistivity, and Rxo=an invasion resistivity.

In some embodiments, a method comprises obtaining the measured resistivity data from the geological formation during wireline or drilling operations.

In some embodiments, a system comprises at least one tool configured to measure resistivity in a geological formation as measured resistivity data; and a processing unit coupled to the at least one tool to receive the measured resistivity data, the processing unit to correct the measured resistivity data for borehole effects to provide borehole-corrected apparent resistivity data for a non-invaded formation, to invert the borehole-corrected apparent resistivity data to provide non-invaded true resistivity values for the non-invaded formation, to invert the measured resistivity data to provide invaded true resistivity values for an invaded formation, and to determine true resistivity values for the geological formation as a weighted combination of the non-invaded true resistivity values and the invaded true resistivity values.

In some embodiments, a system comprises a bit steering mechanism to operate in response to the true resistivity values determined by the processing unit, to control drilling operations in the geological formation.

In some embodiments, the at least one tool comprises an array laterolog tool.

In some embodiments, a system comprises a monitor to indicate transitions from invaded to non-invaded regions of the geological formation, based on the true resistivity values determined by the processing unit.

In summary, the apparatus, systems, and methods disclosed can operate to reduce the inherent ambiguity in the inversion of an invaded formation. When the invasion resistivity is close to that of the formation resistivity, the sensitivity of conventional inversion to the invasion radius is greatly reduced, providing a noisy and visually unappealing log of inversion products—one that is difficult to interpret. However, when the mechanisms described herein are implemented, both invaded and noninvaded zones can be addressed more effectively.

Thus, when two separate inversions are used in accordance with various embodiments described herein, the first assuming invasion is present and the second assuming it is not, the results can be combined using the separation of borehole-corrected resistivities to indicate invasion, reducing ambiguities in the outcome. Moreover, regularization terms that depend on the separation of borehole-corrected apparent resistivities can be employed to force the invasion radius toward zero and the values of Rxo toward Rt when the formation is not invaded, without unduly constraining the solution when borehole-corrected apparent resistivities indicate invasion. As a result, the value of services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for operating a downhole device, comprising:
   measuring, by an array resistivity tool disposed downhole, resistivity in a geological formation to generate radial resistivity data;
   correcting the radial resistivity data for borehole effects to provide borehole-corrected apparent resistivity data for a non-invaded formation;
   inverting the radial resistivity data or the borehole-corrected apparent resistivity data to provide non-invaded true resistivity values for the non-invaded formation;
   inverting the radial resistivity data to provide invaded true resistivity values for an invaded formation; and
   determining true resistivity values for the geological formation associated with the radial resistivity data as a weighted combination of the non-invaded true resistivity values and the invaded true resistivity values.

2. The method according to claim 1, further comprising:
   determining invasion zone resistivity values and invasion radius values while inverting the measured resistivity data using weights applied to calculate the invaded true resistivity values.

3. The method according to claim 2, further comprising:
   constraining a range of the invasion zone resistivity values and the invasion radius values according to prior determined true resistivity values and rates of change.

4. The method according to claim 3, wherein the rates of change comprise constant rates of change associated with the invasion zone resistivity values and the invasion radius values, respectively.

5. The method according to claim 3, wherein the rates of change vary according to a difference in logging point depth.

6. The method according to claim 1, further comprising:
   controlling drilling operations in the geological formation based on the true resistivity values for the geological formation.

7. The method according to claim 6, wherein controlling the drilling operations comprises:
   operating a geosteering device to select a drilling direction in the geological formation, based on the true resistivity values for the geological formation.

8. The method according to claim 6, wherein controlling the drilling operations comprises:
   publishing at least some of the true resistivity values for the geological formation in a human-readable form.

9. The method according to claim 1, wherein inverting the measured resistivity data further comprises:
   applying regularization constants within a cost function vector.

10. The method according to claim 9, wherein the regularization constants are determined by a ratio of standard deviation and maximum values for the borehole-corrected apparent resistivity data.

11. The method according to claim 10, wherein the regularization constants are determined by constant offsets associated with a tool type used to obtain the measured resistivity data.

12. The method according to claim 1, further comprising:
   determining the weighted combination based on the borehole-corrected apparent resistivity data.

13. The method according to claim 12, wherein the weighted combination is determined as one of a linear combination or a logarithmic combination.

14. The method according to claim 1, further comprising:
   constraining a range of the non-invaded true resistivity values according to values of the borehole-corrected apparent resistivity data.

15. The method according to claim 1, wherein inverting the measured resistivity data to provide the invaded true resistivity values for the invaded formation further comprises:
   applying a cost function vector of the form $$\left\{ \begin{array}{l} \left| \dfrac{Ra1 - Ra1^f}{Ra1} \right| \times \dfrac{weight^1}{\sum_i weight^i} \\ \left| \dfrac{Ra2 - Ra2^f}{Ra2} \right| \times \dfrac{weight^2}{\sum_i weight^i} \\ *** \\ \left| \dfrac{Ran - Ran^f}{Ran} \right| \times \dfrac{weight^n}{\sum_i weight^i} \\ \dfrac{|dxo|^{\frac{1}{4}}}{\gamma^c} \\ \theta^c \times \left| \log_{10}\left(\dfrac{Rt}{Rxo}\right) \right|^{\frac{1}{4}} \end{array} \right\}$$

wherein i=a number of resistivity measurement tool operating modes, Ran=an apparent resistivity measured using mode n of the operating modes, $Ran^f$=an apparent resistivity obtained from a forward model, Ra1=an apparent resistivity measured using a mode 1 of the operating modes, Ra2=apparent resistivity measured using a mode 2 of the operating modes, $Ra1^f$=an apparent resistivity obtained from a forward model corresponding to mode 1, $Ra2^f$=an apparent resistivity obtained from a forward model corresponding to mode 2 $weight^i$=a weighting value constant corresponding to operational mode i, $weight^1$=a weighting value constant corresponding to mode 1, $weight^1$=a weighting value constant corresponding to mode 2, dxo=an invasion radius obtained from the forward model, $\gamma^c$=a regularization constant associated with the invasion radius, $\theta^c$=a regularization constant associated with true resistivity, Rt=the true resistivity, and Rxo=an invasion resistivity.

16. The method according to claim 1, further comprising:
   obtaining the measured resistivity data from the geological formation during wireline or drilling operations.

17. The method of claim 1, further comprising:
   presenting a resistivity image based on the true resistivity values of the geological formation.

18. A resistivity tool comprising:
   an array of electrodes disposed downhole in a geological formation; and
   a processing unit coupled to the array of electrodes, the processing unit operating to,
   excite the array of electrodes;

derive radial resistivity data from electrical currents returned by the array of electrodes in response to the excitation;

correct the radial resistivity data for borehole effects to provide borehole-corrected apparent resistivity data for a non-invaded formation;

invert the radial resistivity data or the borehole-corrected apparent resistivity data to provide non-invaded true resistivity values for the non-invaded formation;

invert the radial resistivity data to provide invaded true resistivity values for an invaded formation; and determine true resistivity values for the geological formation as a weighted combination of the non-invaded true resistivity values and the invaded true resistivity values.

19. The resistivity tool according to claim 18, further comprising:

a bit steering mechanism to operate in response to the true resistivity values determined by the processing unit, to control drilling operations in the geological formation.

20. The resistivity tool according to claim 18, wherein the array of electrodes is enclosed within a laterolog tool.

21. The resistivity tool according to claim 18, further comprising:

a monitor to indicate transitions from invaded to non-invaded regions of the geological formation, based on the true resistivity values determined by the processing unit.

22. A method for operating a resistivity tool, comprising:

exciting an array of electrodes disposed downhole in a geological formation;

deriving radial resistivity data from electrical currents returned by the array of electrodes in response to the excitation;

correcting the radial resistivity data for borehole effects to provide borehole-corrected apparent resistivity data for a non-invaded formation;

inverting the radial resistivity data or the borehole-corrected apparent resistivity data to provide non-invaded true resistivity values for the non-invaded formation;

inverting the radial resistivity data to provide invaded true resistivity values for an invaded formation; and determining true resistivity values for the geological formation associated with the radial resistivity data as a weighted combination of the non-invaded true resistivity values and the invaded true resistivity values.

23. The method of claim 22, further comprising:

presenting a resistivity image based on the true resistivity values of the geological formation.

\* \* \* \* \*